March 4, 1947.　　　W. F. VINING ET AL　　　2,416,859
AUTOMATIC WIRE TYING MACHINE
Filed Dec. 23, 1940　　　16 Sheets-Sheet 3
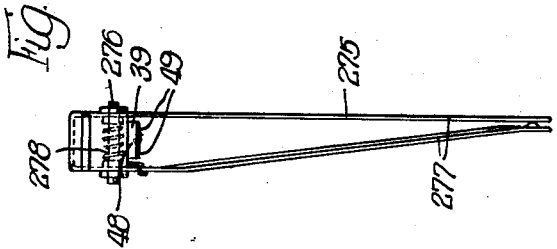
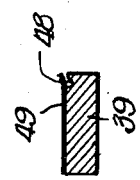
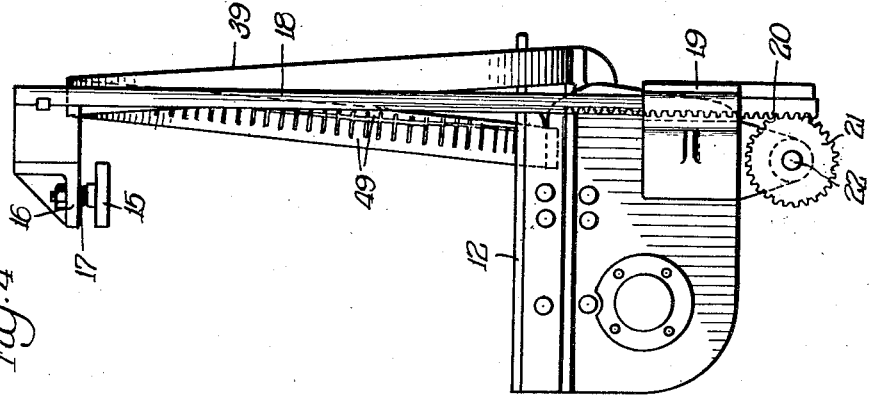
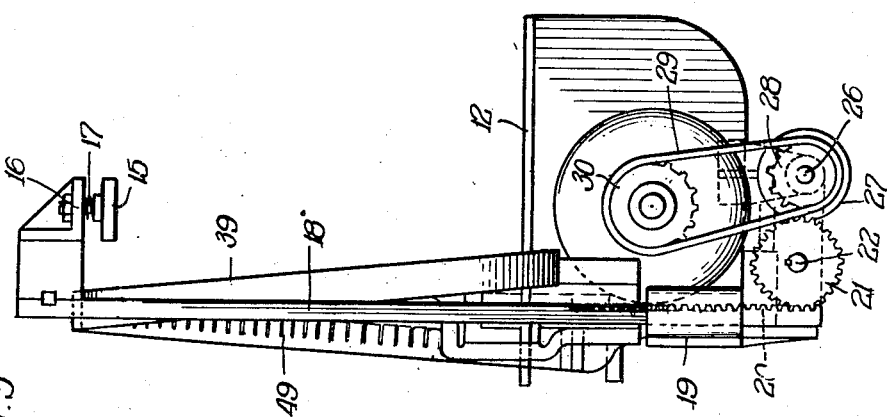
INVENTORS
Willard F Vining,
Martin L. Rowe,
BY Cromwell, Greist + Warden
attys.

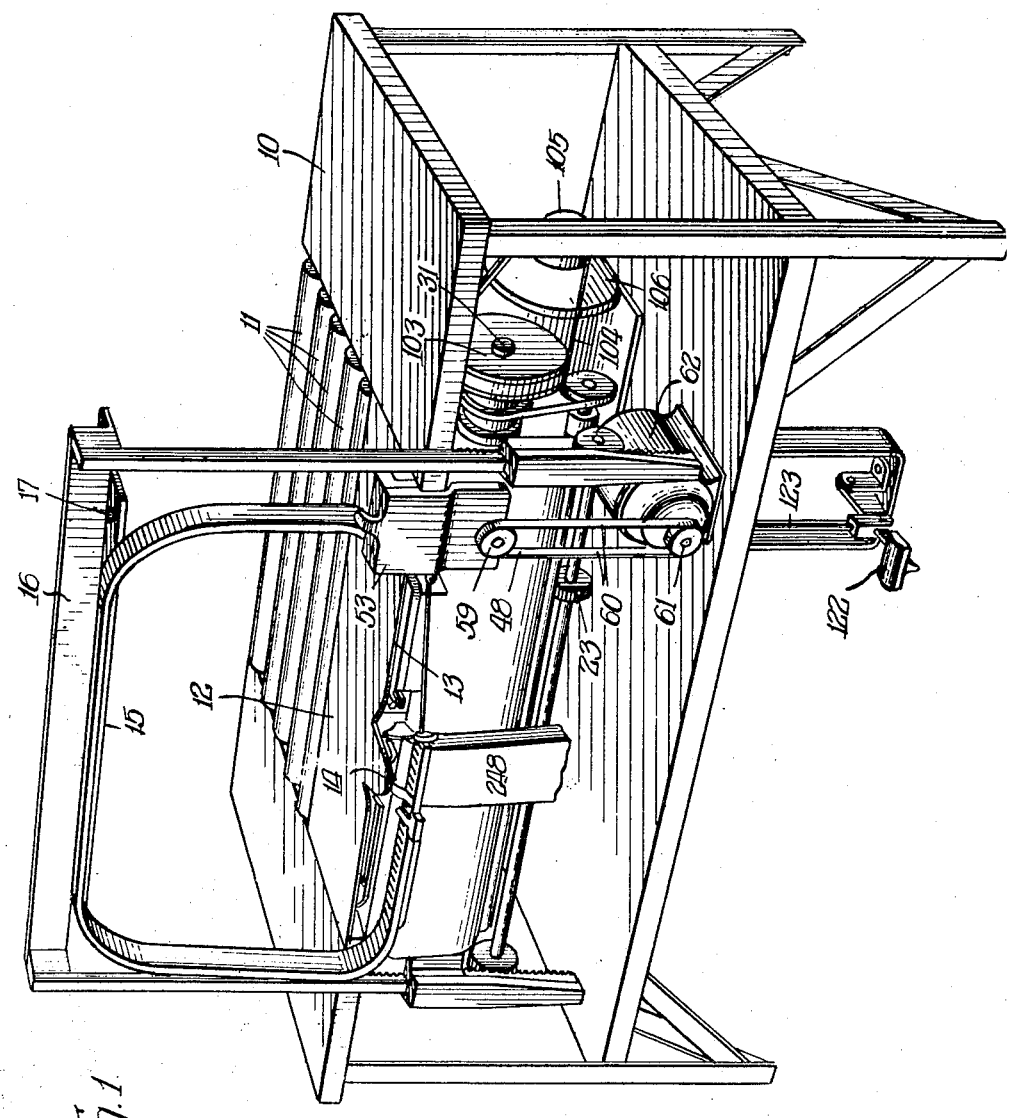

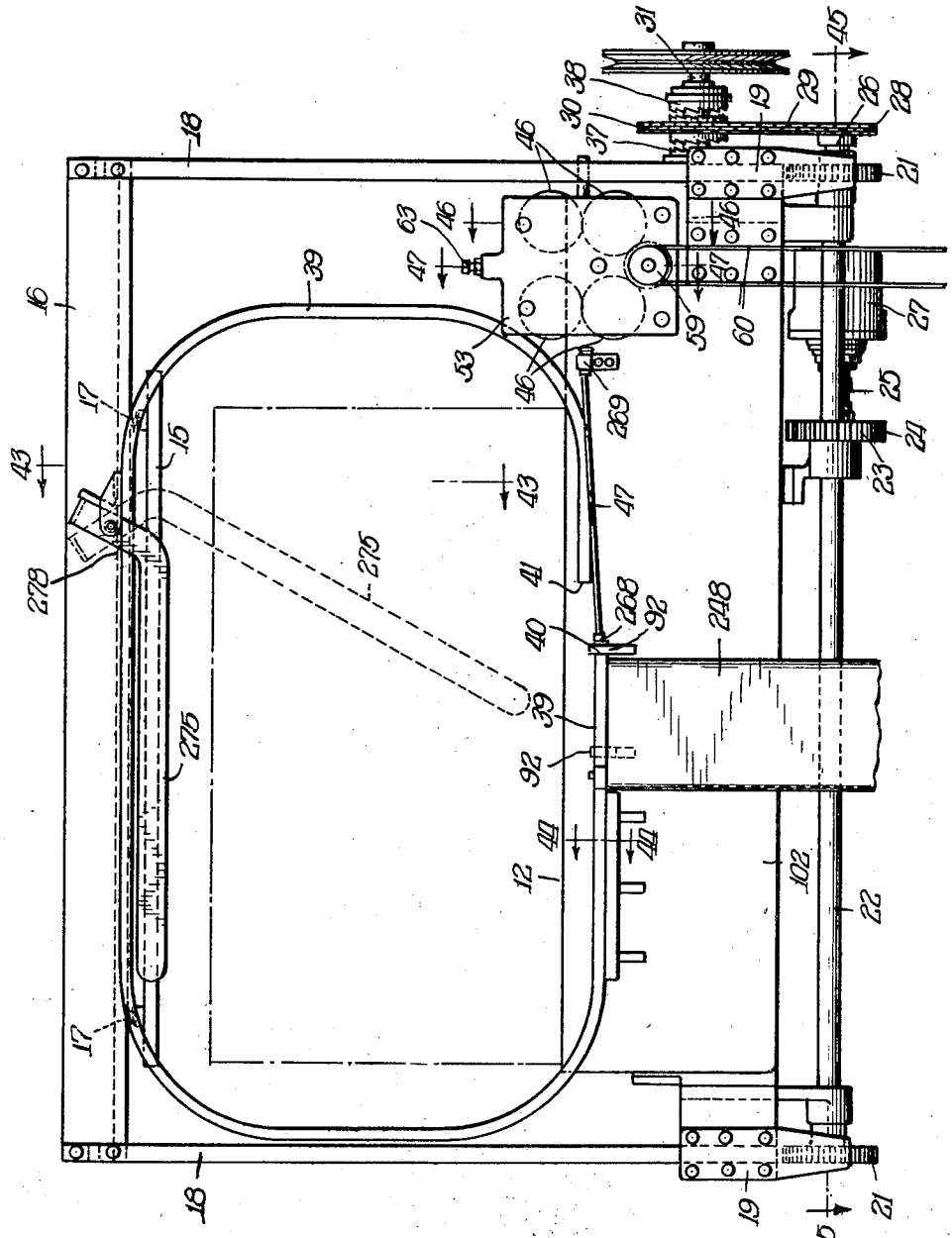

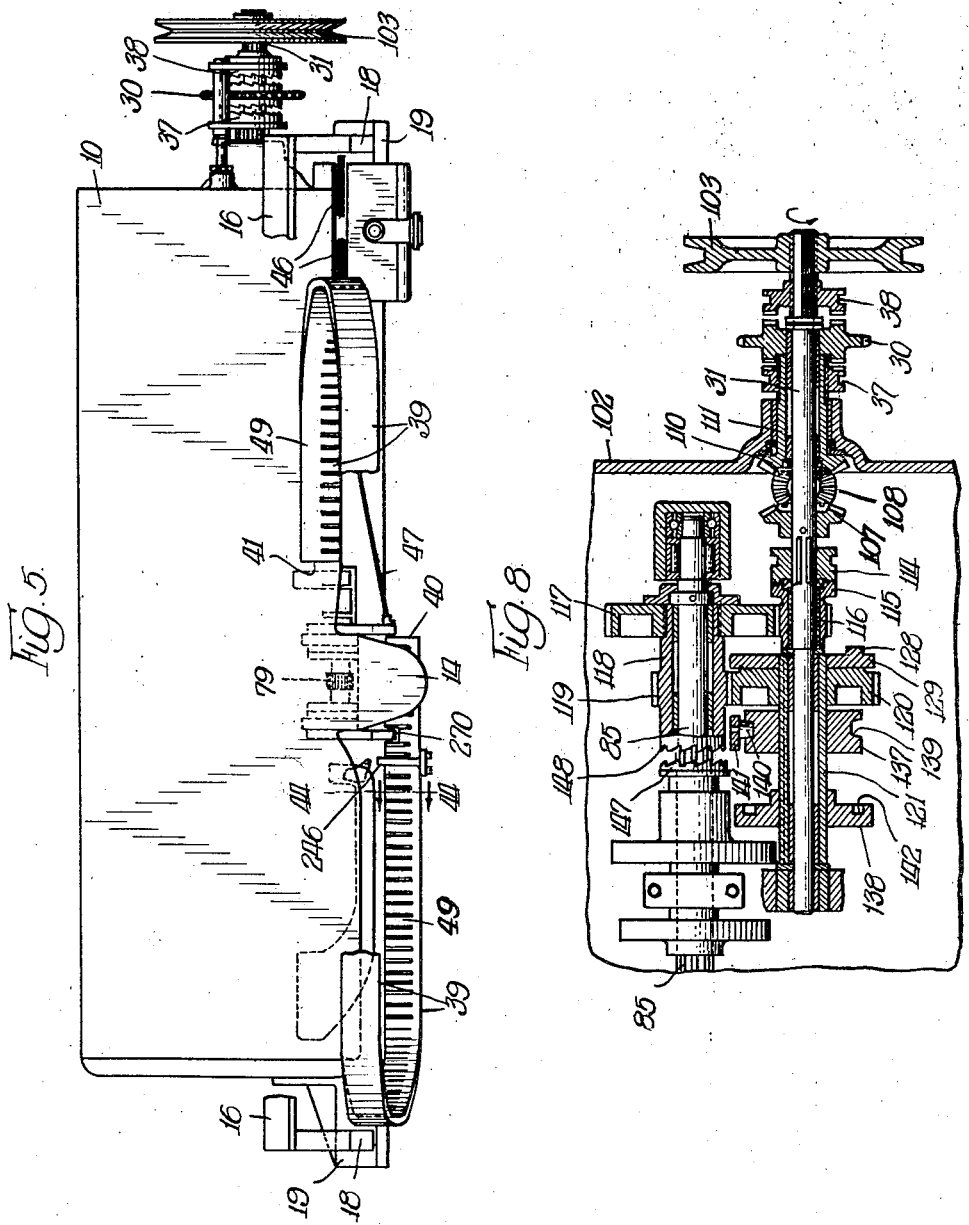

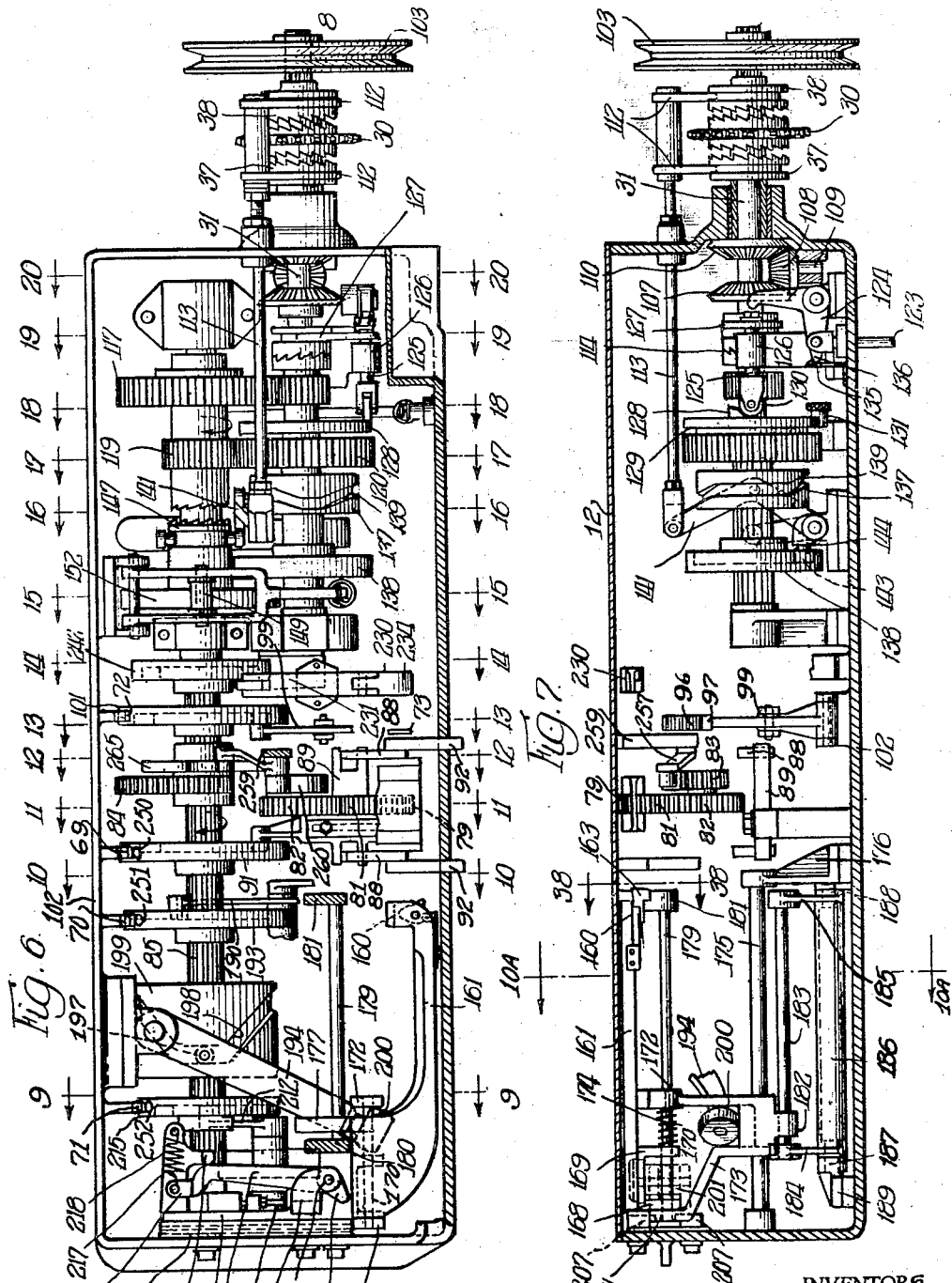

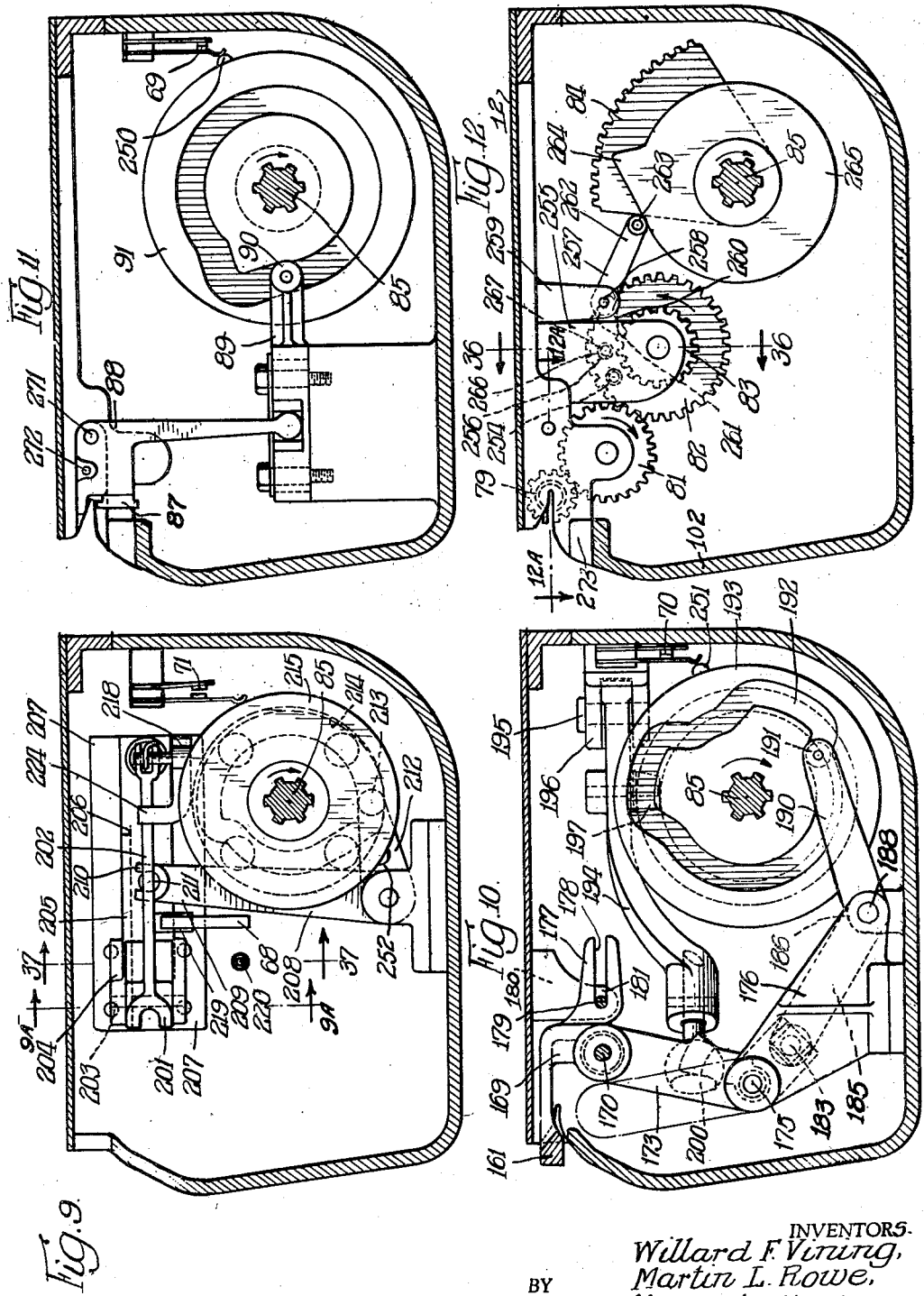

March 4, 1947. W. F. VINING ET AL 2,416,859
AUTOMATIC WIRE TYING MACHINE
Filed Dec. 23, 1940 16 Sheets-Sheet 7
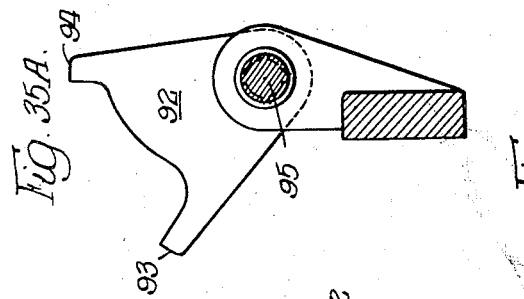
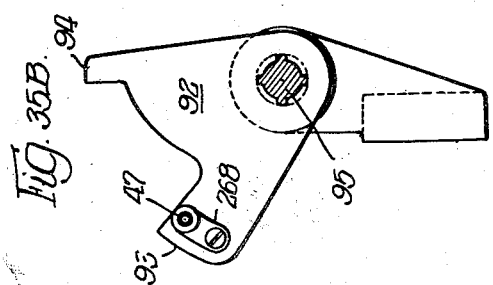
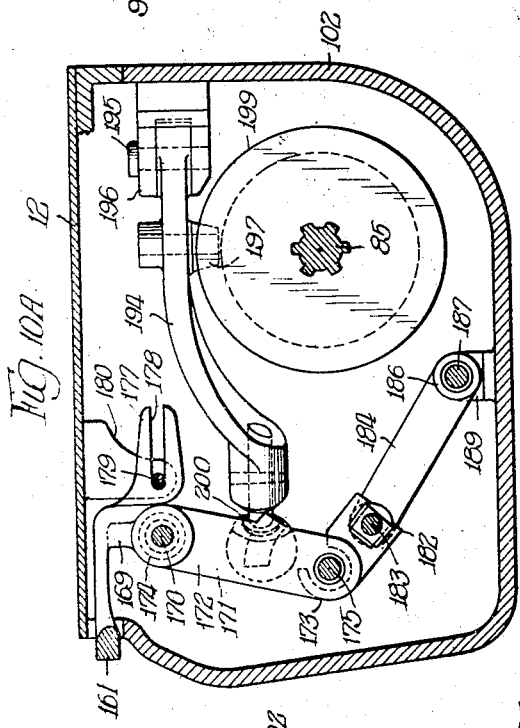
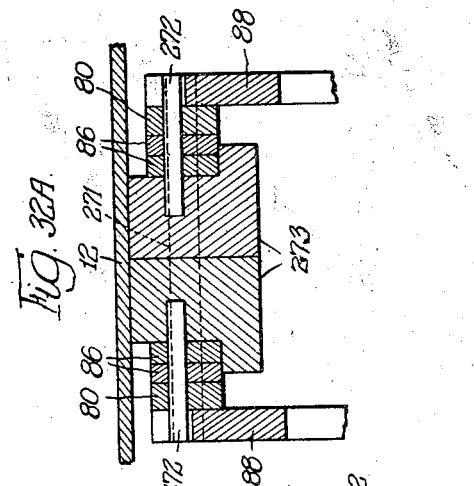
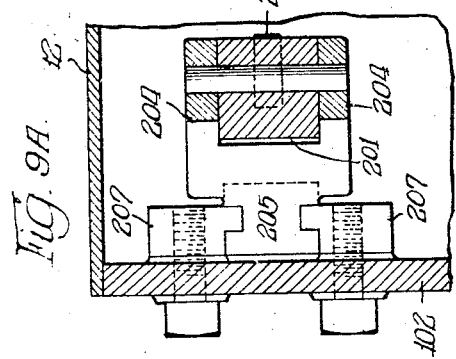
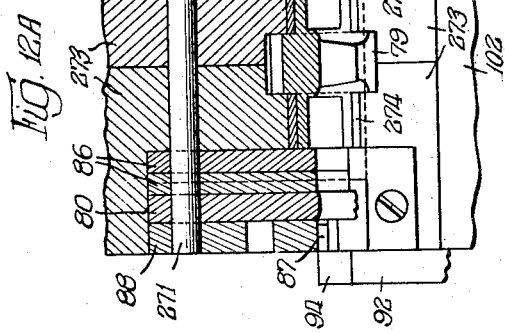
INVENTORS.
Willard F. Vining,
BY Martin L. Rowe,
Cromwell, Greist & Warden
attys March 4, 1947. W. F. VINING ET AL 2,416,859
AUTOMATIC WIRE TYING MACHINE
Filed Dec. 23, 1940 16 Sheets-Sheet 8
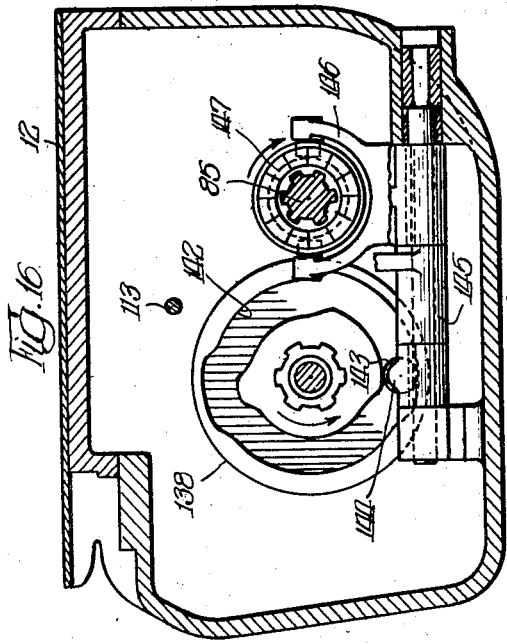
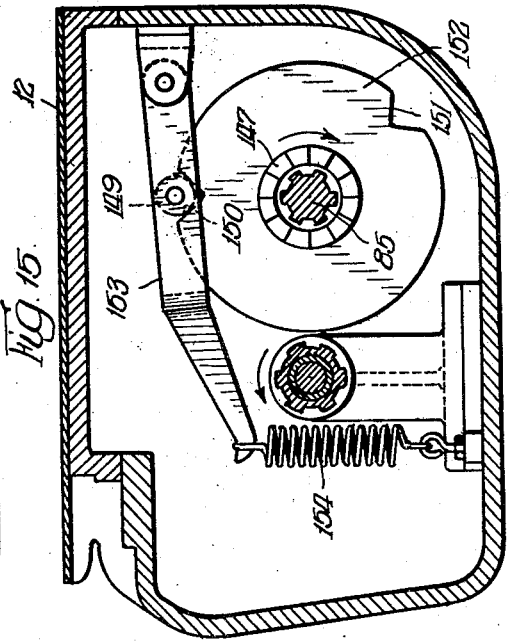
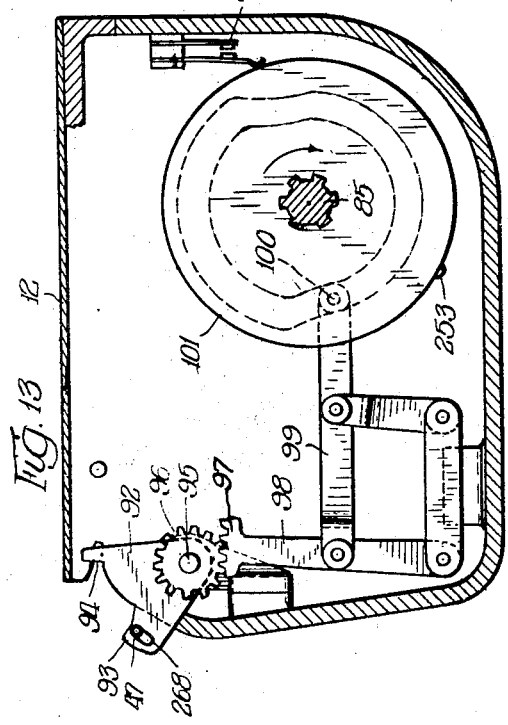
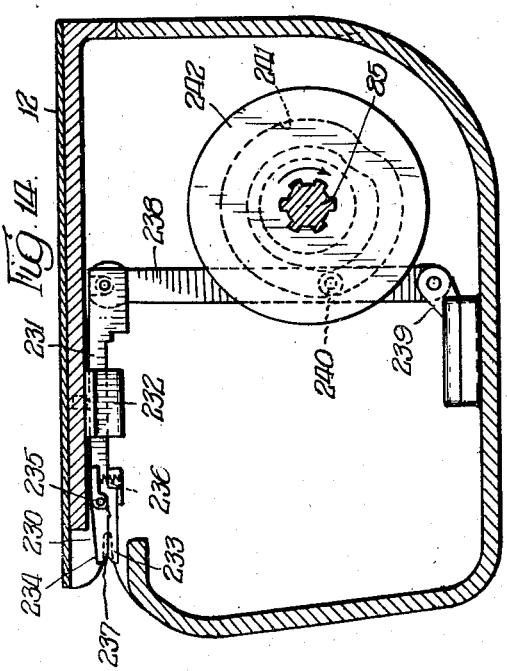
INVENTORS.
Willard F. Vining,
Martin L. Rowe,
BY Cromwell, Greist + Warden
attys.

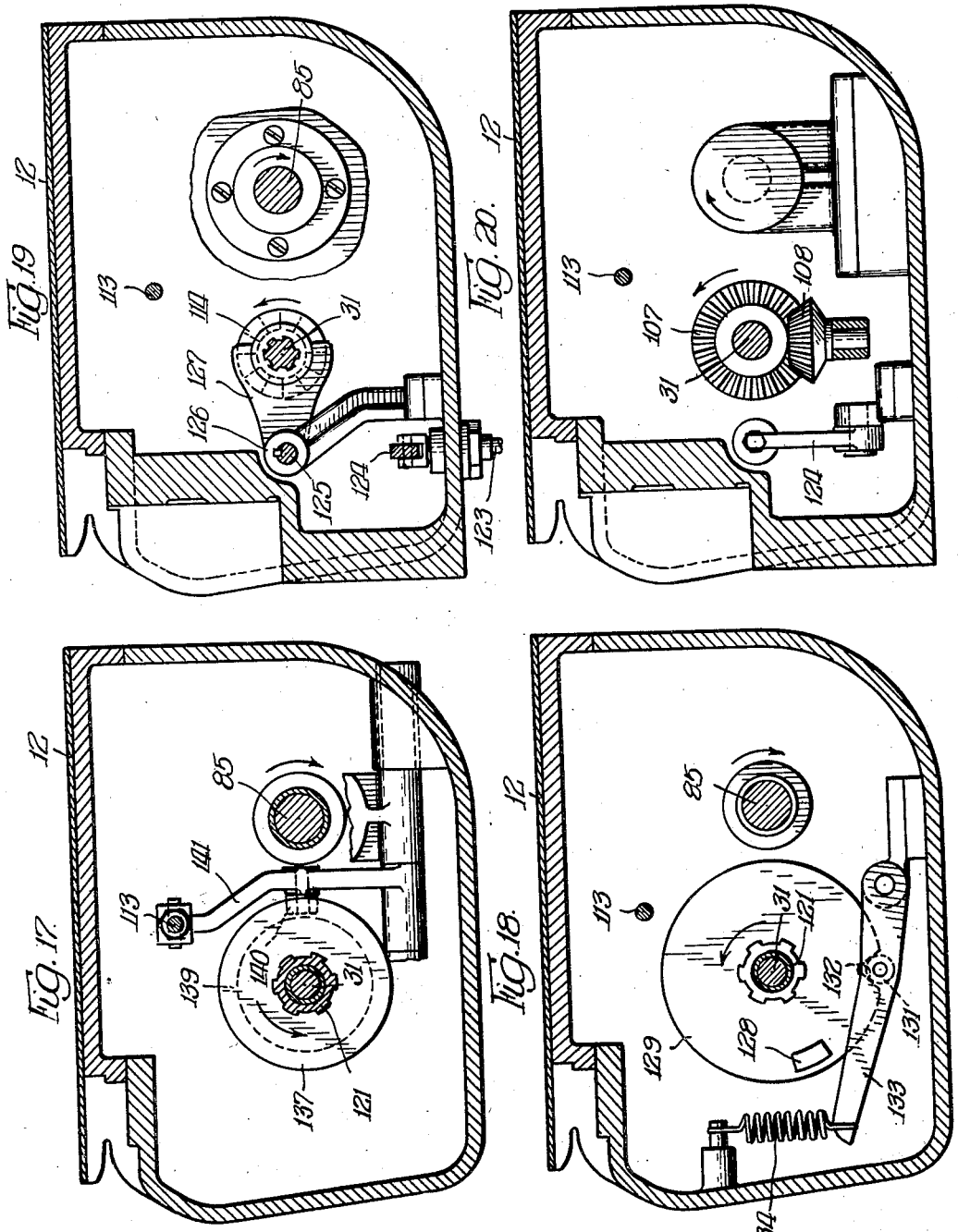

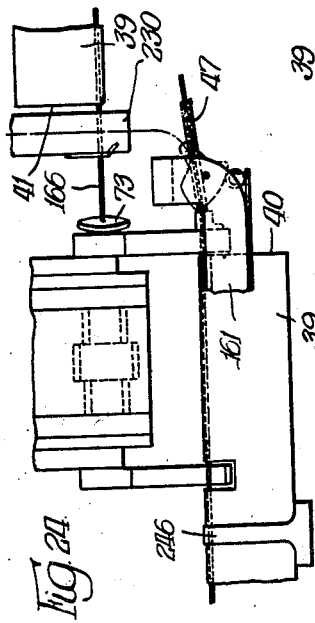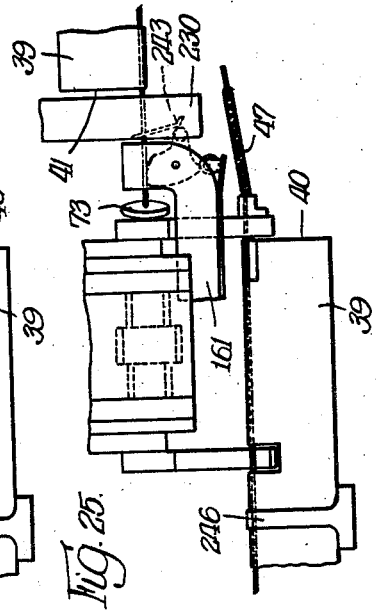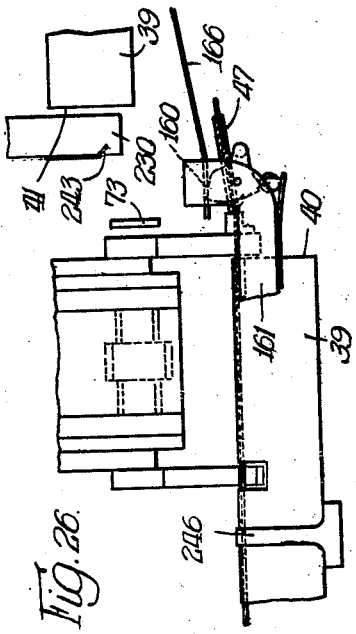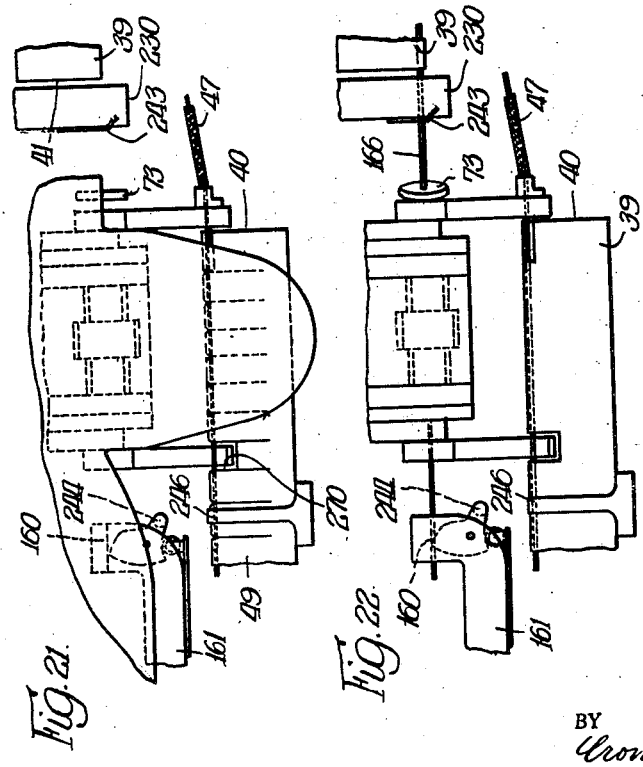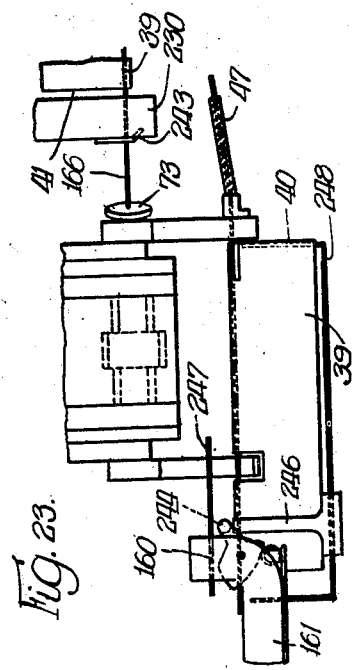

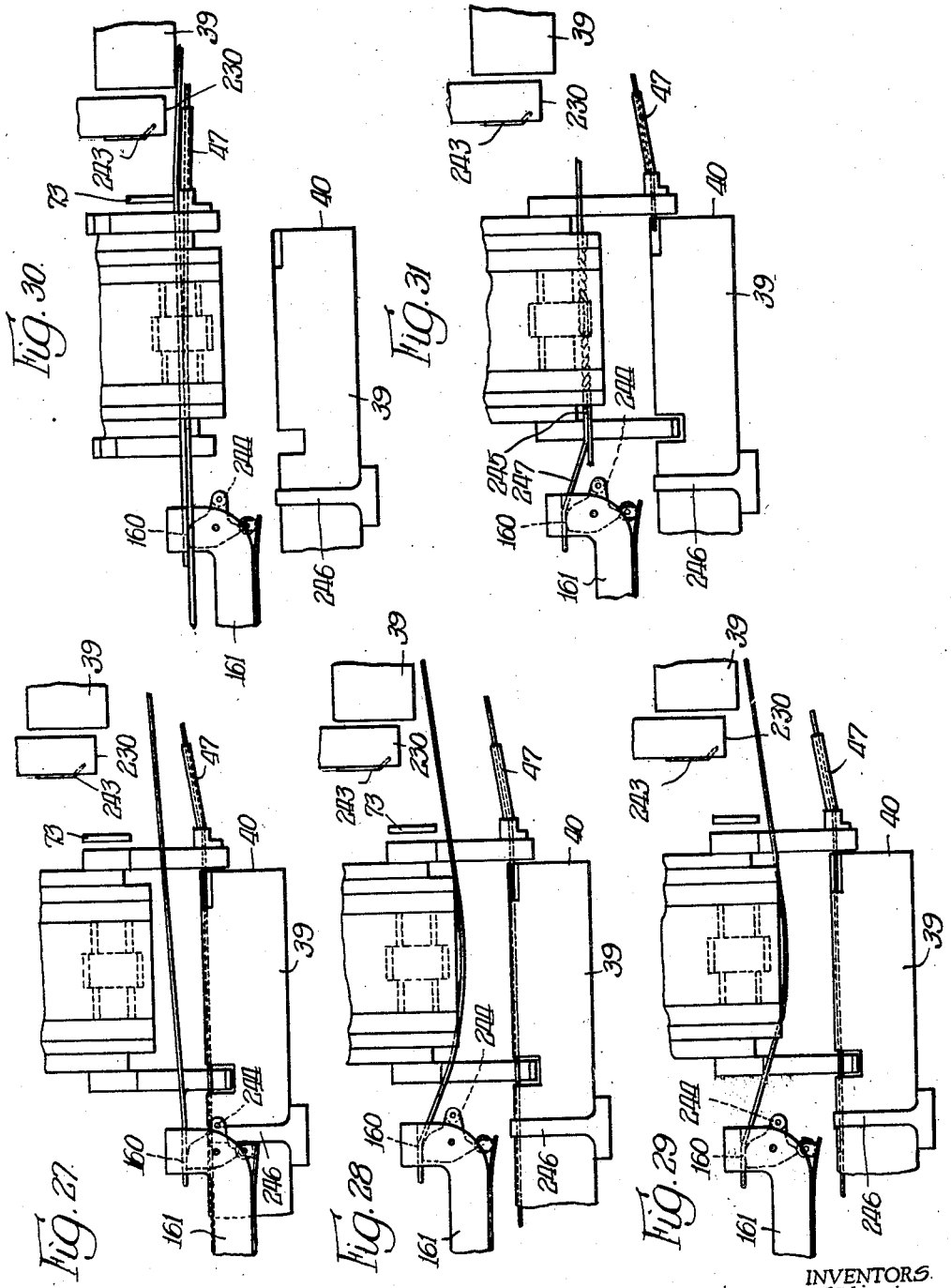

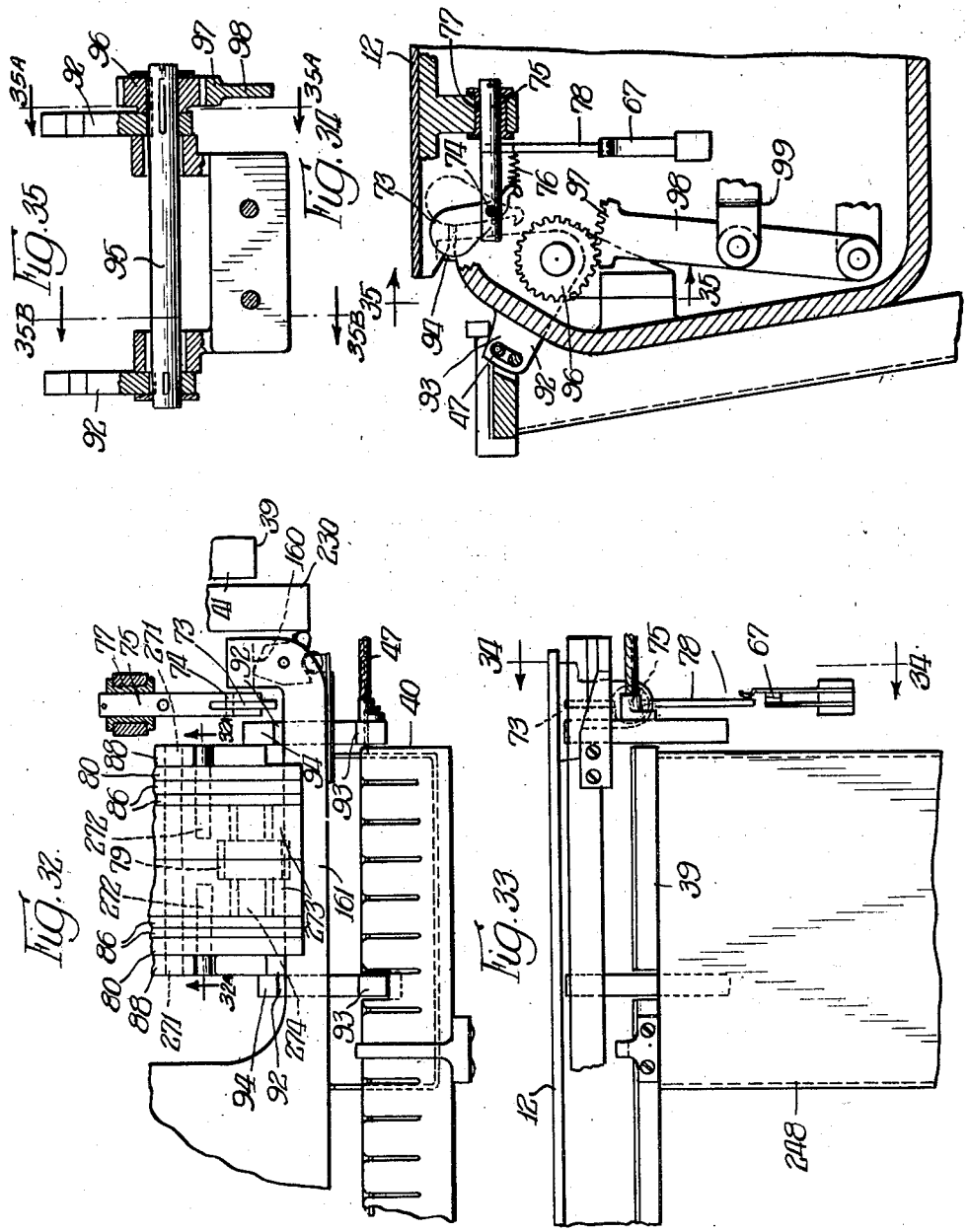

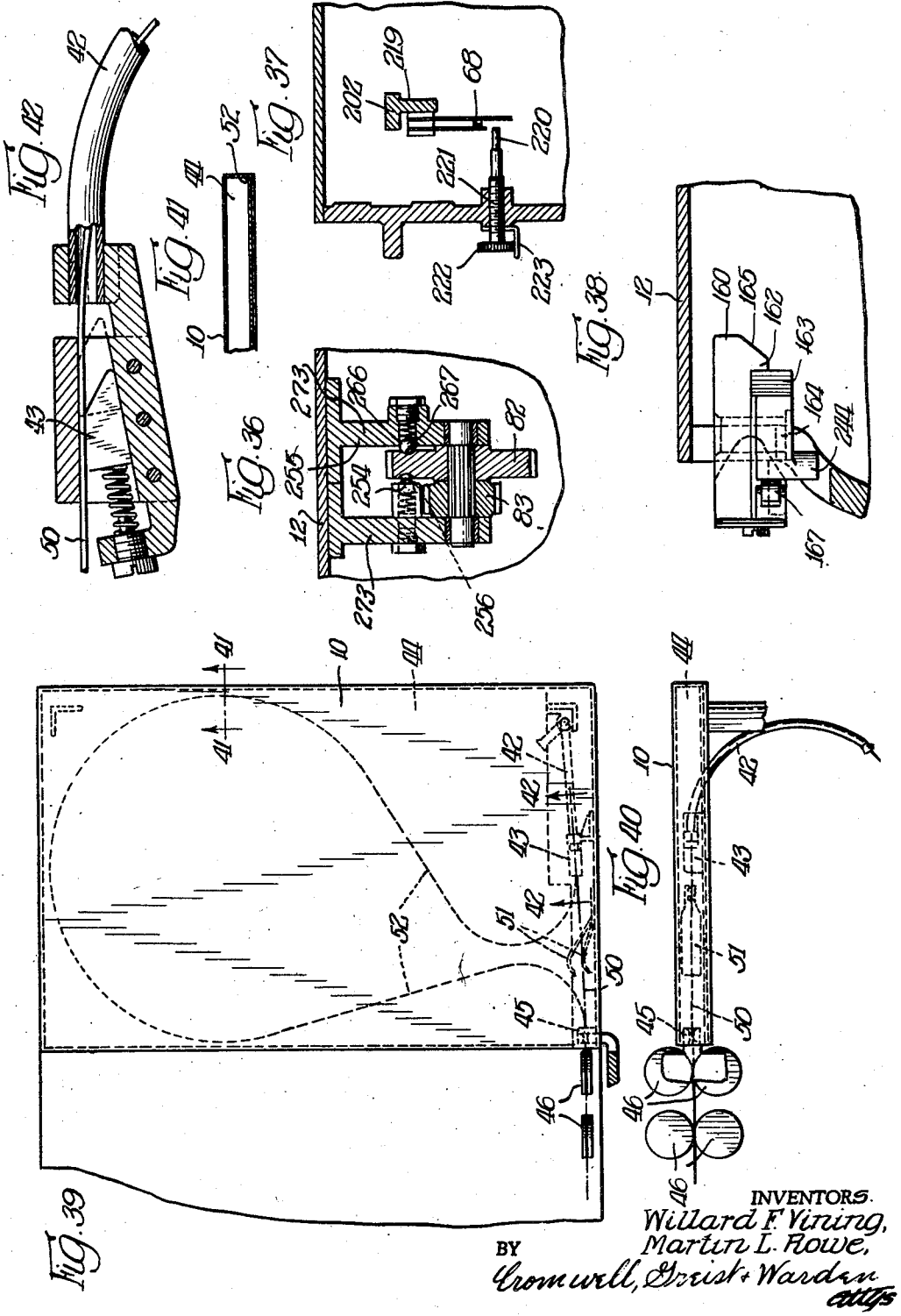

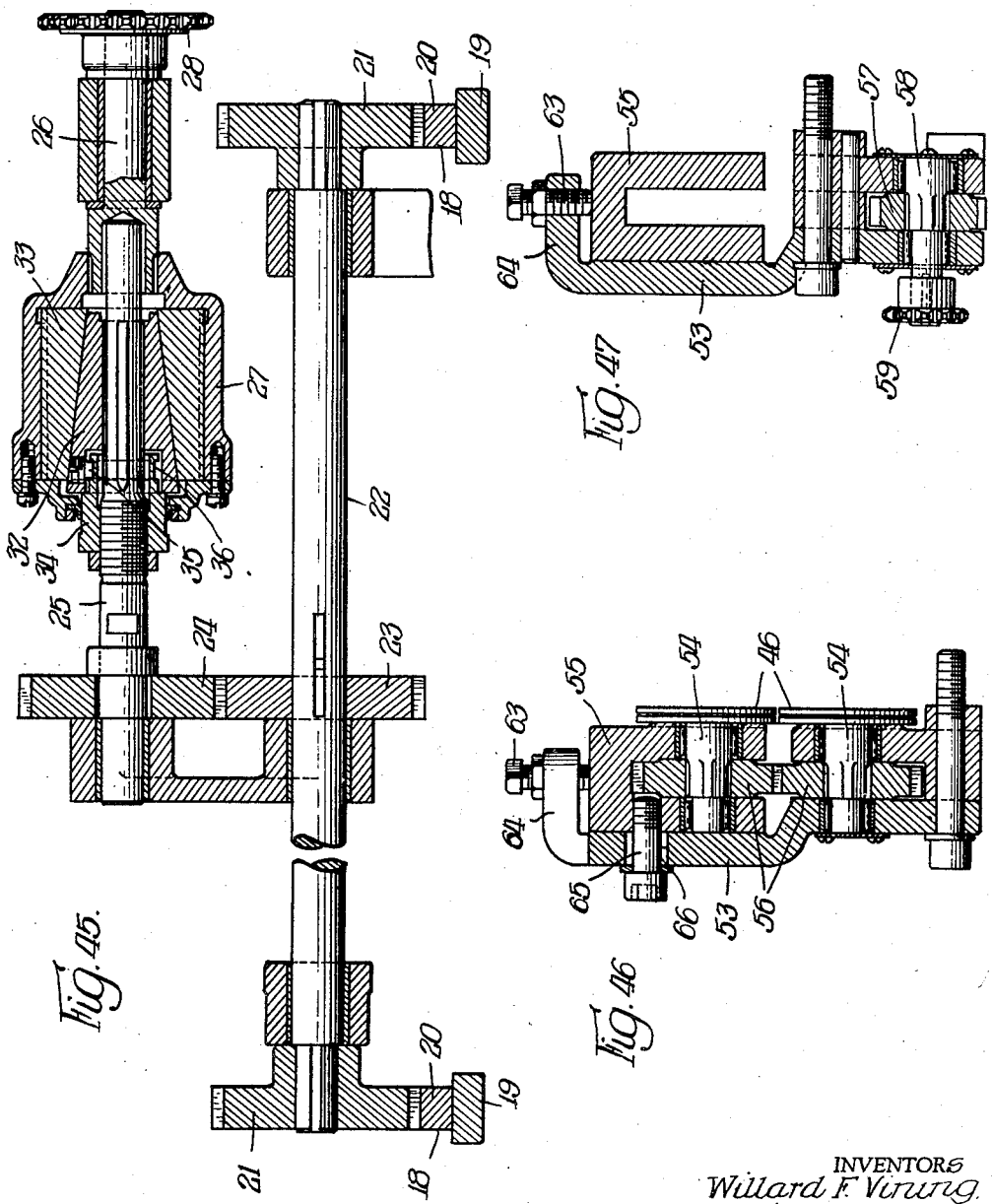

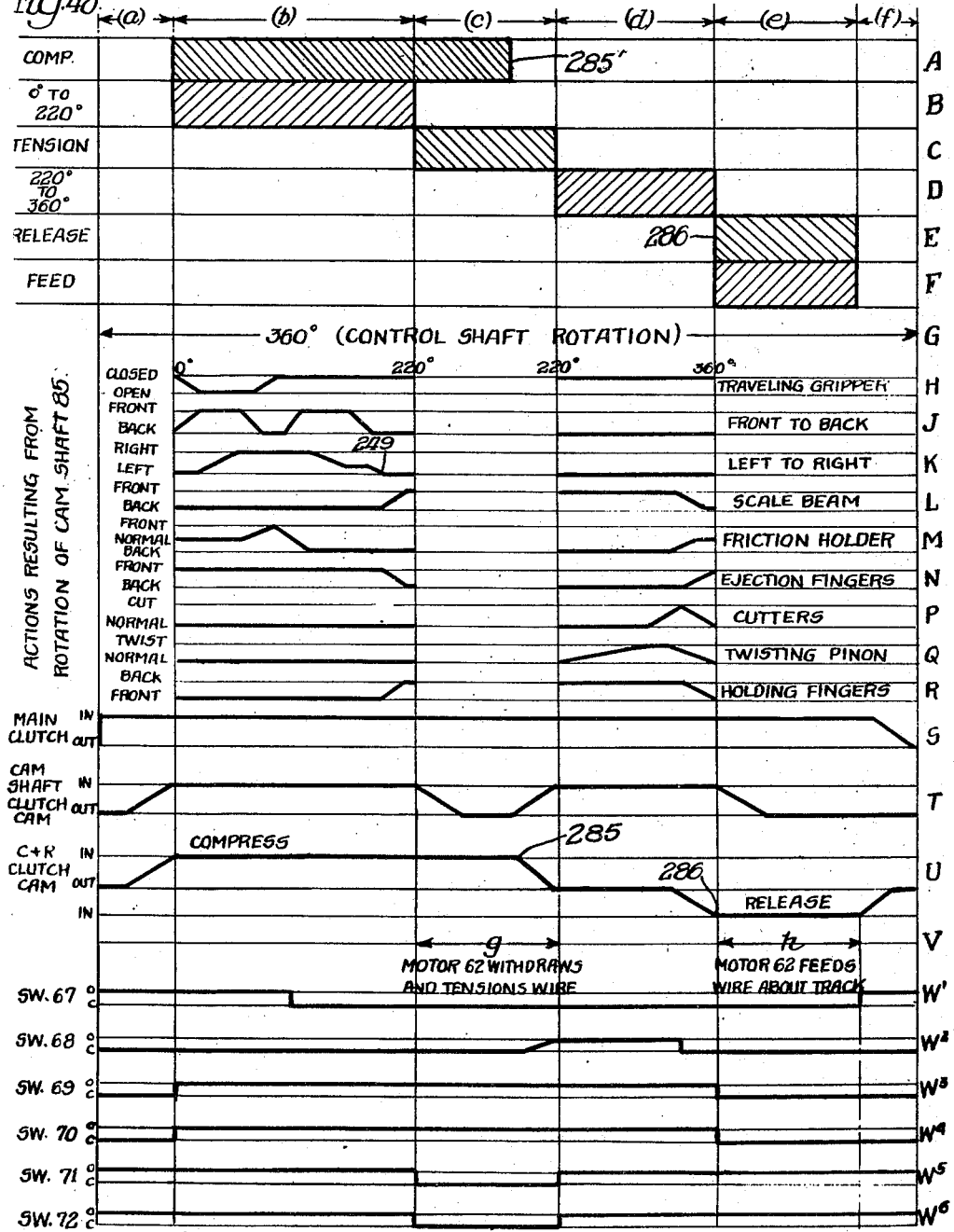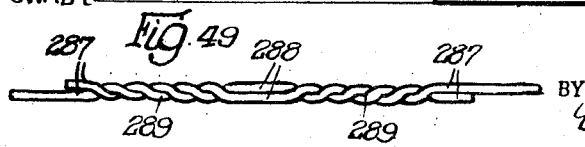

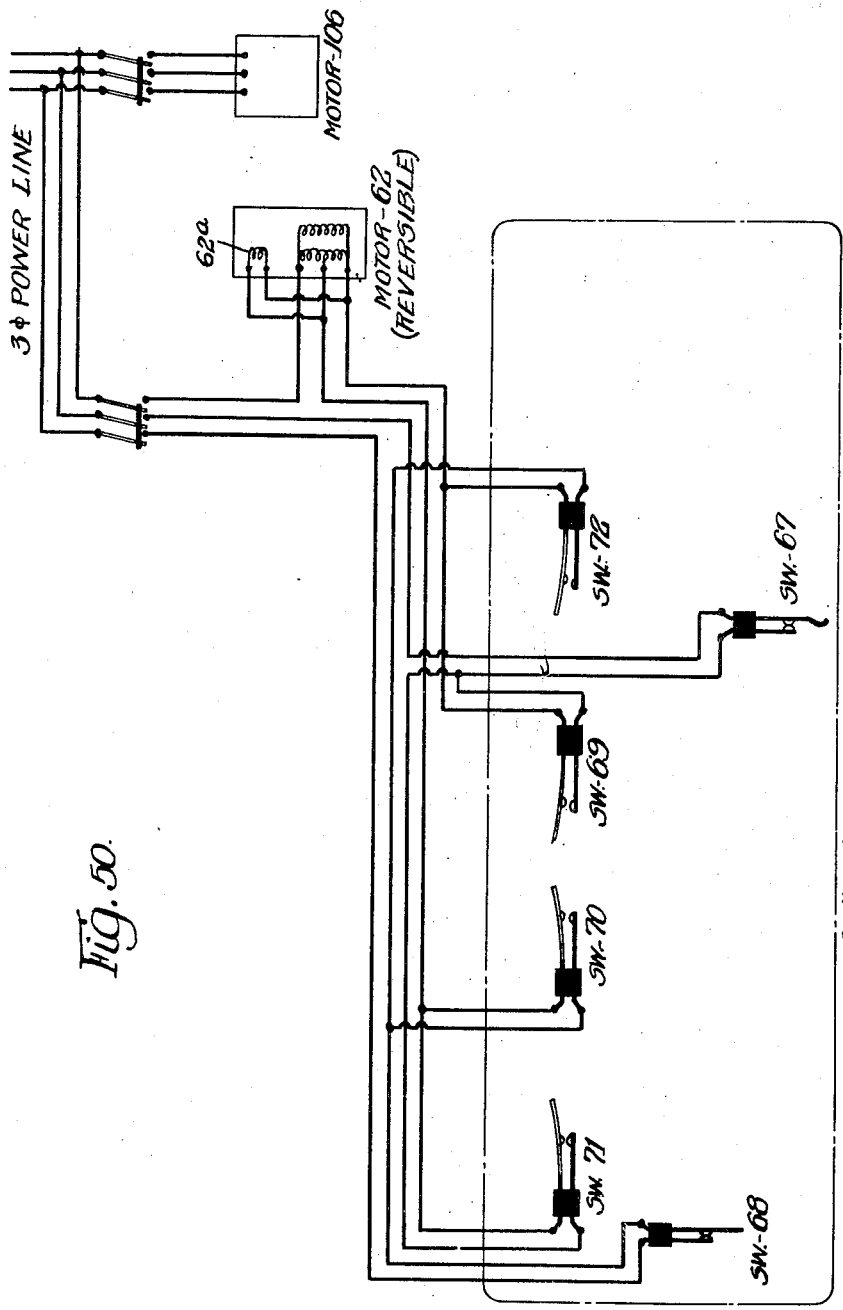

Patented Mar. 4, 1947

2,416,859

UNITED STATES PATENT OFFICE 2,416,859

AUTOMATIC WIRE TYING MACHINE

Willard F. Vining, Chicago, and Martin L. Rowe, Oak Park, Ill., assignors to Gerrard Steel Strapping Company, a corporation of Delaware Application December 23, 1940, Serial No. 371,334

27 Claims. (Cl. 100—31)

This invention has to do with wire tying machines, and is particularly concerned with fully automatic wire tying machines of the type in which a wire is looped about a box or other article to be bound, drawn taut under tension, twisted to form a tie, and cut beyond the ends of the tie to remove any surplus end portion and disconnect the tied portion from the supply.

The principal object of the invention is to provide an improved machine of the type described which is light, compact, inexpensive to manufacture, positive in operation, dependable in performance, rugged in construction, and easy to service.

While the foregoing statements are indicative in a general way of the nature of the invention, numerous other more specific objects and advantages will be apparent to those skilled in the art upon a full understanding of the construction, arrangement and operation of the improved machine.

A preferred embodiment of the invention is presented herein for the purpose of exemplification, but it will of course be appreciated that the invention is susceptible of incorporation in various other structurally modified forms coming equally within the scope of the appended claims.

In the accompanying drawings:

Fig. 1 is a perspective view of a fully automatic wire tying machine constructed in accordance with the invention;

Fig. 2 is a front elevation of the machine;

Fig. 3 is an end elevation of the machine;

Fig. 4 is an opposite end elevation;

Fig. 5 is a plan view of the machine, with a section of the upper portion of the track for the wire broken away and certain internal parts dotted in;

Fig. 6 is a plan view with the cover plate removed, showing certain external parts, and having the front wall of the housing broken away irregularly for the purpose of greater clarity in showing certain of the internal parts;

Fig. 7 is a vertical longitudinal section through the housing, taken just inside the front wall of the housing, and omitting certain parts for greater clarity;

Fig. 8 is a horizontal section through the main drive shaft, the control shaft, a portion of the cam shaft and the reduction gears connecting said shafts, but omitting certain parts for greater clarity;

Fig. 9 is a vertical transverse section through the housing, taken on the line 9—9 of Fig. 6, showing the scale beam employed in placing a predetermined tension on the wire after the latter has been brought taut about the article, and the cam on the cam shaft for projecting the scale beam forwardly into hooked engagement with the reciprocating wire gripper, and omitting certain parts for greater clarity;

Fig. 9A is a vertical fragmentary section, taken on the line 9A—9A of Fig. 9, showing the mounting of the scale beam and associated parts on the housing;

Fig. 10 is a similar section, taken approximately on the line 10—10 of Fig. 6, showing the cam on the cam shaft for imparting forward and backward movement to the carriage, also the cam for imparting right and left movement to said carriage, but omitting the gripper carried thereby and certain other parts for greater clarity;

Fig. 10A is a similar section, taken on the line 10A—10A of Fig. 7, omitting the cam for imparting forward and backward movement to the reciprocating wire gripper and omitting certain other parts but making clear the motion of the levers actuated by said cam;

Fig. 11 is a similar section, taken approximately on the line 11—11 of Fig. 6, showing the right-hand wire cutter and cam on the cam shaft for operating the cutters, but omitting certain parts for greater clarity;

Fig. 12 is a similar section, taken approximately on the line 12—12 of Fig. 6, showing the radially slotted wire twisting pinion, the mutilated gear on the cam shaft for rotating such pinion, and the cam on the cam shaft for returning the pinion to its open position after it has been rotated past that position by the mutilated gear in imparting an over-twist to the tied wires, and omitting certain parts for greater clarity;

Fig. 12A is a fragmentary horizontal section taken on line 12A—12A of Fig. 12, showing the twisting pinion and certain other parts assembled in the two-part casing, and a method of securing the casing to the housing;

Fig. 13 is a similar section, taken on the line 13—13 of Fig. 6, showing the holding and ejecting fingers, and the cam on the cam shaft for operating the fingers, and omitting certain parts for greater clarty;

Fig. 14 is a similar section, taken on the line 14—14 of Fig. 6, showing the friction holder for gripping the leading end of the looped wire until engaged by the reciprocating gripper, and the cam on the cam shaft for advancing and retracting the holder, and omitting certain parts for greater clarity;

Fig. 15 is a similar section, taken on the line 15—15 of Fig. 6, showing the indexing means on the cam shaft for bringing the cam shaft to rest in predetermined positions, and omitting certain parts for greater clarity;

Fig. 16 is a similar section, taken on the line 16—16 of Fig. 6, showing the cam on the control shaft for operating the clutch used in connecting the cam shaft with the main drive shaft through the reduction gear assembly, and omitting certain parts for greater clarity;

Fig. 17 is a similar section, taken on the line 17—17 of Fig. 6, showing the cam on the control shaft used in operating the two oppositely acting clutches for the compression mechanism, and omitting certain parts for greater clarity;

Fig. 18 is a similar section, taken on the line 18—18 of Fig. 6, showing the cam on the control shaft for throwing out the main clutch upon completion of the operating cycle, and the indexing means on the same cam for thereupon bringing the control shaft to rest in a predetermined position, and omitting certain parts for greater clarity;

Fig. 19 is a similar section, taken on the line 19—19 of Fig. 6, showing the main clutch between the main drive shaft and the reduction gear assembly connected with the control shaft, and omitting certain parts for greater clarity;

Fig. 20 is a similar section, taken on the line 20—20 of Fig. 6, showing the bevel gearing used in reversing the direction of movement of the compression mechanism, and omitting certain parts for greater clarity;

Fig. 21 is a schematic plan view of the center portion of the machine, at the location of the twisting and cutting mechanisms, showing the various parts before any wire has been fed into the machine;

Fig. 22 is a similar view, with wire in the machine, showing the positions of the reciprocating wire gripper, the holding and ejecting fingers, the flexible wire feed tube and other parts upon completion of the twisting, cutting and ejecting operations;

Fig. 23 shows the same parts after the reciprocating wire gripper has moved forwardly to a position over the discharge chute;

Fig. 24 shows the gripper, in its forward position, after it has moved to the right into a position in front of the new end of the wire looped about the article;

Fig. 25 shows the gripper after it has moved rearwardly and picked up the end of the wire;

Fig. 26 shows the gripper after it has moved forwardly with the end;

Fig. 27 shows the gripper after it has moved to the left and carried with it the end of the wire;

Fig. 28 shows the gripper after it has moved rearwardly with the end of the wire;

Fig. 29 shows the gripper after it has moved a little more to the left from the position shown in Fig. 28, ready to be picked up by the scale beam;

Fig. 30 shows the overlapped wire portions after they have been forced together and moved rearwardly into the slot in the twisting pinion, in readiness for the tensioning, twisting and cutting operations;

Fig. 31 shows the completed tie after the same has been forced out of the twisting pinion by the ejector fingers;

Fig. 32 is a fragmentary plan view of the machine, at the location of the twisting mechanism, showing the wire target, with the bearing for the stem of the target shown in section;

Fig. 32A is a fragmentary section taken on the line 32A—32A of Fig. 32, showing the assembled positions of the holding yokes, filler blocks, cutter holders, pivot pins and dowel pins in the two-part casing;

Fig. 33 is a fragmentary front elevation of the machine at the same location, showing more particularly the switch operated by the target;

Fig. 34 is a vertical transverse section through the housing of the machine, taken on the line 34—34 of Fig. 33, again showing the switch and the target;

Fig. 35 is a vertical section, taken on the line 35—35 of Fig. 34, showing the holding and ejecting fingers;

Fig. 35A is a fragmentary section, taken on the line 35A—35A of Fig. 35, showing the contour of the left-hand sector-shaped holding and ejector finger plate;

Fig. 35B is a fragmentary section taken on the line 35B—35B of Fig. 35, showing the contour of the right-hand sector-shaped holding and ejector finger plate;

Fig. 36 is a vertical section through the gear train for the twisting pinion, taken on the line 36—36 of Fig. 12;

Fig. 37 is a vertical section through one end of the housing, taken on the line 37—37 of Fig. 9, showing the adjusting screw for the switch operated by the scale beam;

Fig. 38 is an end elevation of the reciprocating wire gripper, taken on the line 38—38 of Fig. 7;

Fig. 39 is a fragmentary plan view of the right-hand end of the machine and table, showing the pocket for accommodating the wire fed back during the reverse rotation of the feed rolls;

Fig. 40 is a front elevation of the same portion of the machine and table;

Fig. 41 is a fragmentary vertical section through the feed-back pocket, taken on the line 41—41 of Fig. 39;

Fig. 42 is a horizontal section through the delivery end of the wire tube leading from the supply, showing the one-way clutch for preventing return movement of the wire;

Fig. 43 is a vertical section through the upper portion of the wire track, taken on the line 43—43 of Fig. 2, showing the clip employed for lowering the upper stretch of the looped wire straight down onto the article when stripped from the upper portion of the track;

Fig. 44 is a vertical section through the lower portion of the track, taken on the line 44—44 of Fig. 2;

Fig. 45 is a horizontal section, taken on the line 45—45 of Fig. 2, showing the adjustable slip clutch unit employed in operating the article compressing mechanism;

Fig. 46 is a vertical section, taken on the line 46—46 of Fig. 2, showing the means employed for adjusting the wire feeding rolls;

Fig. 47 is a similar section, taken on the line 47—47 of Fig. 2;

Fig. 48 is a diagrammatic representation of the principal moving parts of the machine, showing their sequence of operation in relation to one full operating cycle of the machine;

Fig. 49 is a plan view of a tie of the character produced by the machine; and

Fig. 50 is an electrical wiring diagram for one type of electric current supply, showing the necessary connections to the various switches in the machine, the two electric motors, the electromagnetic means for disengaging a spring-engaged brake on one of the motors, auxiliary switches for controlling the energizing of either of the two motor circuits, but not showing the main switch across the power line for cutting off both motor circuits simultaneously.

The machine shown in the drawings is a self-contained unit which is positioned in a recess in a table-like support 10 in a position substantially flush with the top of such support. The unit can be removed easily from the support 10 should occasion require. The support 10 may take any one of many different forms, and may include, if desired, a plurality of anti-friction rollers 11 for receiving articles from a conveyor of any sort and passing them along, one at a time, to a flat horizontal plate 12 which forms the work suporting portion of the machine. The plate 12 is provided, near the center of the front edge 13 of the same, with a forwardly projecting lip 14 (see Fig. 1) which permits the article which is to be tied to be placed in an overhanging position with respect to the front edge 13.

The machine is provided, in substantially the vertical plane of the front edge 13, with an overhead pressure bar 15 (see Figs. 2, 3 and 4) which descends and places pressure on the top of the article immediately prior to the tying operation. Where the article is compressible—as in the case of a bundle of newspapers—the pressure bar 15 will be operated by the hereinafter described slip clutch to effect any desired degree of compression of the article prior to and during the tying operation. The pressure bar 15 is carried in a horizontal position by a cross bar 16 and is normally spaced from the cross bar 16 by small coil springs 17 which allow the pressure bar 15 to conform generally to the plane of the top of the article being compressed. The cross bar 16 is rigidly connected at its ends to the upper ends of two upright bars 18 which are movable vertically in guides 19 at opposite ends of the front edge 13 of the top plate 12. The lower ends of the upright bars 18 are provided with racks 20 which mesh with pinions 21 (see Fig. 45) on the ends of a shaft 22. The shaft 22 is located in a horizontal position some distance below the top plate 12 and is provided intermediate its ends with a third pinion 23. The pinion 23 meshes with a pinion 24 on a rearwardly offset shaft 25, and the shaft 25 is driven from a second axially aligned shaft 26 through a manually adjustable slip clutch unit 27 of any suitable design. The shaft 26 is provided with a sprocket 28 which is driven by a chain 29 from a sprocket 30 journaled on a shaft 31. The shaft 31 constitutes the main drive shaft of the machine.

The adjustable slip clutch unit 27 consists of a male cone member 32 (see Fig. 45) which is splined on the shaft 25 and a female cone member 33 which is keyed indirectly to the shaft 26. The member 32 frictionally engages within the member 33 and is adjustable axially of the member 33 by a nut 34. The nut 34 is screwed on the shaft 25 and is connected with the member 32 by a pin 35. The pin 35 is carried by the member 32 and engages within an annular groove 36 in a telescoping portion of the nut 34. The amount of torque which the unit 27 will deliver from the shaft 26 to the shaft 25 can be regulated by loosening a suitable lock nut and turning the nut 34 in one direction or the other.

When the sprocket 30 is rotated in one direction, by a clutch 37 (see Fig. 8) at one side of the same, the pressure bar 15 will descend and apply pressure to the upper surface of the article resting on the plate 12. When this pressure has reached a predetermined amount, further rotation of the sprocket 30 will cause the clutch unit 27 to slip with a predetermined amount of resistance, maintaining the desired pressure on the article as long as the sprocket 30 continues to rotate in that direction. When the sprocket 30 is thereafter rotated in the reverse direction, by a clutch 38 at the other side of the same, the pressure bar 15 will ascend to its initial out-of-the-way position.

The machine is provided, also in substantially the vertical plane of the front edge 13, with a wire looping track 39 (see Figs. 2, 3 and 4). The track 39 is located immediately in front of the pressure bar 15 and extends in a generally rectangular helical path from its receiving end 40 to its delivery end 41. The receiving end 40 is located some distance below the level of the top plate 12, while the delivery end 41 is located just below the level of the top plate 12 in rearwardly offset relation to the receiving end 40.

The wire used in tying the article is drawn from a coil or other suitable supply (not shown), passes through a tube 42 (see Figs. 39, 40, 41 and 42) past a spring-pressed clutch block 43 which prevents any reverse movement of the wire through the tube, enters a large flat feed-back pocket 44 formed within the upper portion of the right-hand side of the table-like support 10, leaves the pocket 44 through a guide 45 which is spaced from but aligned axially with the delivery end of the tube 42, passes between two pairs of grooved feed rolls 46 (see Figs. 46 and 47), enters a flexible tube 47, and is directed by the tube 47 into a groove 48 in the receiving end of the track 39. The groove 48 extends the full length of the looped track 39, in confronting relation to the article on the top plate 12, and is partially closed at all points throughout its length by one or more fingered spring strips 49, which spring strips confine the wire within the groove when being projected through the same while allowing the wire to be stripped from the groove when the leading end of the wire is held against return movement and the direction of rotation of the feed rolls 46 reversed. At the receiving end 40 of the track 39 the groove 48 in the track is located near the rear edge of the track, as shown in Fig. 44, and only one spring strip 49 is employed. At the delivery end 41 of the track the groove 48 is located near the front edge of the track, and again only one spring strip 49 is employed. As the groove 48 leaves the receiving and delivery ends 40 and 41 it moves progressively nearer the center of the track, reaching the center at the top of the track as shown in Fig. 43. Along those portions of the track where the groove 48 is located near the center two of the fingered spring strips 49, instead of one, are employed. This progressive shifting of the groove 48, from the rear edge of the receiving end 40 of the track to the front edge of the delivery end 41, permits the wire to be fed about the track with a minimum offset of the wire portions at the point of completion of the loop.

As the incoming wire—indicated at 50 in Figs. 39, 40 and 42—is drawn from the tube 42 by the feed rolls 46 it forces back a light leaf spring 51 located in the pocket 44. When the direction of rotation of the feed rolls 46 is reversed, causing the wire to be fed back, the spring 51 will push the wire sidewise a short distance and cause it to accumulate in the pocket 44 in a large loose loop 52 in readiness for the next wire feeding operation.

The feed rolls 46 are mounted on a bracket 53 (see Figs. 46 and 47) on short shafts 54. The lower shafts 54 are provided with stationary bearings, while the upper shafts 54 are journaled in bearings which are formed in a vertically movable bar 55. The shafts 54 are provided with pinions 56 which mesh together in vertically aligned pairs, and the lower pinions 56 mesh with an intermediate pinion 57 on another shaft 58. The shaft 58 is provided, exteriorly of the bracket 53, with a sprocket 59 which is driven by a chain 60 (see Figs. 1 and 2) from a sprocket 61 on the shaft of an electric motor 62. The feed rolls 46 in each pair can be moved relative to each other, in order to regulate the frictional engagement of the same with the wire, by a set screw 63 in an overhanging portion 64 of the bracket 53. The set screw 63 engages with the upper surface of the vertically movable bar 55. The bar 55 is supported and guided in its vertical movement by clamping bolts 65 which are screwed into the bar and operate in vertically elongated slots 66 in the bracket.

The electric motor 62 is reversible, and is equipped with a spring-engaged disk brake (not shown) for preventing rotation of the motor armature in either direction when the motor is not running, which disk brake is magnetically disengaged by electromagnetic means, indicated at 62a in Fig. 50, when the motor 62 is running. The circuit of the motor 62 is provided, in addition to a main switch (not shown), with an auxiliary switch and with six cross-connecting switches 67, 68, 69, 70, 71 and 72 which will be described later in more detail. When the circuit is completed through the switches 67, 68, 69 and 70 the motor 62 and the magnets for the disk brake on the motor will be energized, releasing the brake and starting the motor in its forward direction to rotate the feed rolls 46 to feed the wire 50 endwise into the track 39. When the circuit is completed through the switches 67, 68, 71 and 72, the motor 62 and the magnets for the disk brake are energized to rotate the feed rolls 46 in the opposite direction to retract and tension the wire about the article to be tied.

When the leading end of the wire, after traveling the full length of the looped track 39, reaches the delivery end 41 of the track, it engages with and tilts to the left a pivotally mounted target 73 (see Figs. 32, 33 and 34) which thereupon opens the previously mentioned switch 67 in the circuit of the motor 62 and brings the forward rotation of the feed rolls 46 to a braked stop by action of the above mentioned spring-engaged disk brake. The target 73 is secured by a pivot pin 74 to a horizontal rod 75 and is held in forwardly swung position by a spring 76, which spring yields to permit the target to be moved rearwardly in the plane of the target when the front end of the target is engaged by one side of the wire at another point in the operating cycle of the machine. The rod 75 is mounted to rock in a bearing 77 and is provided with a downwardly extending pin 78 in alignment with the switch 67. When the leading end of the wire tilts the target 73 to the left the lower end of the pin 78 will move to the right far enough to open the switch 67.

The machine of the invention produces a flat tie of well known type (see Fig. 49) by twisting together overlapped wire portions in a radially slotted pinion 79. The pinion 79 is journaled in suitable bearings in a two-part casing 273 (see Figs. 12, 12A) adapted to hold the twisting pinion 79 and certain other parts. This casing is also adapted at each end for attachment by screws or other means to the front and rear walls of the housing 102 at about the center of the machine. The pinion 79 is positioned in the casing 273 between two similarly slotted holding yokes 80 (see Figs. 5, 12, 12A and 32) and is rotated through three reduction gears 81, 82 and 83 from a sector-shaped gear 84 on a shaft 85. The shaft 85 is what will be hereinafter referred to as the cam shaft of the machine.

The holding yokes 80 are spaced from the ends of the twisting pinion 79 by filler blocks 86 (see Figs. 12A, 32 and 32A), which filler blocks determine the length of the oppositely twisted sections of the tie.

Immediately beyond the holding yokes 80 are two cutters 87 (see Figs. 11, 12A and 32) which are mounted on the forwardly extending portions of two pivotally mounted L-shaped holders 88. The cutter on the right is shaped to sever only the outer one of the two overlapped wire strands held in the yokes 80, while the cutter on the left is shaped to sever only the inner one of the two strands. The downwardly extending portions of the holders 88 fit into laterally elongated slots in a slide plate 89, which slots permit lateral adjustment of the cutters. The slide plate 89 is operated by a cam follower 90 from a grooved cam 91 on the previously mentioned cam shaft 85.

The filler blocks 86 are preferably of multi-ply construction, so as to enable the plies thereof to be separated to alter the distance between the twisting pinion 79 and the holding yokes 80. When it is desired to produce a shorter tie, using smaller gauge wire, one or more of the plies of the filler blocks 86 are removed from between the twisting pinion and the holding yokes and positioned beyond the cutter holders 88.

Immediately beyond the cutters 87 are two sector-shaped plates 92 which are provided with wire holding fingers 93 and wire ejecting fingers 94 (see Figs. 12A, 13, 32, 32A, 34, 35, 35A and 35B). The plates 92 are secured to a rock shaft 95 which is provided at one end with a pinion 96. This pinion meshes with a short arcuate rack 97 on the upper end of a lever 98. The lever 98 is pivotally supported at its lower end and is connected intermediate its ends to a suitably supported link 99 which carries a cam follower 100. The cam follower 100 coacts with a grooved cam 101 on the cam shaft 85. The delivery end of the previously described flexible wire feeding tube 47 is secured to the right-hand plate 92, in register with an aperture in the holding finger portion 93 of that plate, and moves forwardly and rearwardly with the plate.

It will be apparent in one method of assembly (see Fig. 12A) that the outer sides of the cutters 87 and the L-shaped holders 88 are flush with and overlapped by some portion of the inner sides of the plates 92 secured to and laterally positioned by the rock shaft 95. It will be apparent also that when the holders 82, yokes 80 and filler blocks 86 are re-assembled in using a smaller gauge wire requiring a shorter die as mentioned above, the outer sides of the outer filler blocks 86 are flush with and overlapped by some portion of the inner sides of the plates 92. In any given assembly of the filler blocks, yokes and holders either the sides of the holders 88, or the sides of the outer filler blocks 86, will be overlapped at all times by some portion of the plates 92. The holders, yokes and filler blocks are therefore maintained in their assembled positions on the pivot pins 271 and dowel pins 272 secured in the two-part casing 273.

The main drive shaft 31 and the cam shaft 85 are journaled in suitable bearings provided in the housing 102 of the machine. The shaft 31 is provided at its right-hand end with a pulley 103 which is connected by a belt 104 (see Fig. 1) with a pulley 105 on the shaft of a second electric motor 106 having a second auxiliary switch. The shaft 31 carries a bevel gear 107 (see Figs. 6, 7, 8 and 20) which meshes with a bevel pinion 108 on a countershaft 109, and the bevel pinion 108 in turn meshes with a bevel gear 110 which is secured to one end of a sleeve 111 journaled on the shaft 31. The sleeve 111, which is caused by this gearing to rotate in a direction opposite that of the shaft 31, has shiftably splined thereon the previously described clutch member 37 which is adapted to engage with the left-hand side of the sprocket 30 to cause the pressure bar 15 to move downwardly. The previously described clutch member 38, which is adapted to engage with the right-hand side of the sprocket 30 to cause the pressure bar 15 to move upwardly, is shiftably splined to the shaft 31 between the sprocket 30 and the pulley 103. The two clutch members 37 and 38 are coupled by plates 112 to a clutch shifting rod 113 and are operated simultaneously by the rod. When the rod 113 is in a neutral position the sprocket 30 is disengaged from both of the clutch members 37 and 38. When the rod 113 is shifted to the right the clutch member 37 will cause the sprocket 30 to turn in a direction opposite that of the shaft 31. When the rod 113 is shifted to the left the clutch member 38 will cause the sprocket 30 to turn with the shaft 31. The shaft 31 rotates continuously.

The machine is placed in operation by a clutch member 114 which constitutes the main clutch of the machine. The clutch member 114 is slidably splined on the main drive shaft 31 and is adapted to be shifted to the left into engagement with a clutch member 115 (see Figs. 7, 8 and 19) formed on a pinion 116. The pinion 116 is journaled on the shaft 31 and meshes with a gear 117 which is secured to a tubular shaft 118. The tubular shaft 118 is journaled on the right-hand end of the previously described cam shaft 85 and is provided with a pinion 119 which meshes with a gear 120 on a tubular shaft 121 journaled on the left-hand end of the shaft 31. This gearing serves to drive the tubular shaft 121 from the main drive shaft 31 at a materially reduced speed as soon as the main clutch 114 is thrown in. The tubular shaft 121 is what will be hereinafter referred to as the control shaft of the machine.

The main clutch 114 is operated by a foot pedal 122 through a rod 123 (see Figs. 1, 7, 19 and 20) and a bell crank lever 124. The lever 124, when rocked by depression of the pedal 122, forces a rod 125 in a bracket 126 to move to the left, causing the clutch member 114, which is connected to the rod 125 by a plate 127, to move to the left into clutched engagement with the clutch member 115.

As soon as the control shaft 121 has made one complete revolution the main clutch 114 will be automatically thrown out by a cam 128 (see Figs. 7, 8 and 18) on a disk 129 on the control shaft, which cam engages a cam follower 130 on the left-hand end of the rod 125 and shifts the main clutch back into neutral. The control shaft 121 is brought to rest in the same position every time by an indexing roller 131 (see Figs. 7 and 18) which rides into a notch 132 in the periphery of the disk 129. The roller 131 is carried by a pivotally mounted lever 133 which is connected at its free end to an upwardly acting spring 134. An indexing spring 135, in engagement with a nose 136 on one of the ends of the bell crank lever 124, acts to maintain the main clutch 114 in either its engaged position or its disengaged position.

The control shaft 121 is provided, in addition to the main clutch throw-out cam 128, with two other cams 137 and 138 (see Figs. 6, 7 and 8). The cam 137 acts to shift the push-and-pull rod 113 in first one direction and then the other to operate the article-compressing mechanism. The cam 137 is provided in its periphery with a cam groove 139 in which a cam follower 140 is positioned. As the cam 137 rotates the groove 139 shifts its position axially, first in one direction and then in the other. The cam follower 140 is mounted on a lever 141 (see Figs. 6, 7, 8 and 17) which is pivotally supported at its lower end, and the upper end of the lever 141 is attached to the left-hand end of the rod 113.

The cam 138 is provided with a cam groove 142 (see Figs. 7, 8 and 16) in which a cam follower 143 is positioned. The cam follower 143 is mounted on a short arm 144 which projects from one side of a rock shaft 145, and the rock shaft 145 is provided, at a point beneath the cam shaft 85, with a clutch shifting fork 146 which is connected with a clutch member 147. The clutch member 147 is slidably splined on the cam shaft 85, for movement to the right into clutched engagement with a clutch member 148 on the adjacent end of the tubular shaft 118 of the reduction gear unit. The clutch member 147, when shifted to the right by the action of the cam 138 on the control shaft 121, connects the cam shaft 85 with the main drive shaft 31 through the reduction gears 116 and 117, causing the cam shaft 85 to rotate at a greater speed than the control shaft 121 but at a lesser speed than the main drive shaft 31. The cam shaft 85, like the control shaft 121, makes one complete revolution during each operating cycle of the machine. It makes this complete revolution in two separate movements, however, rotating first through an angle of 220° and later through the remaining angle of 140°. At the end of its first movement the cam shaft 85 is brought to rest by the action of the cam 138 on the control shaft 121, which shifts the clutch member 147 to the left. The cam shaft 85 is brought to rest, first in its 220° position and finally in its original or zero position, by an indexing roller 149 (see Figs. 6 and 15) which rides into properly located grooves 150 and 151 in the periphery of a disk 152 carried by the clutch member 147. The indexing roller 149 is mounted on a pivoted lever 153 which is connected at its free end with a downwardly acting spring 154.

The machine is provided with a wire gripper 160 (see Figs. 6 and 32) which is mounted on the right-hand end of a reciprocating carriage 161. The carriage 161, with the gripper 160, moves in a rectilinear path. Starting in its retracted left-hand position (see Fig. 22), the carriage 161 first moves toward the front of the machine (see Fig.

23), then toward the right (see Fig. 24), then toward the rear (see Fig. 25), then toward the front (see Fig. 26), then toward the left (see Fig. 27), then toward the rear (see Fig. 28) just before reaching its extreme left-hand position, and then toward the left again into its extreme left-hand position (see Fig. 29). This rectilinear movement of the carriage 161 transfers the gripper 160 from a position at the left-hand side of the twisting pinion 79 to a position at the right-hand side of the twisting pinion and back again.

The gripper 160 consists of a stationary jaw 162 (see Fig. 38) on the carriage 161 and a movable jaw 163 which is pivoted at 164 to the carriage. The rear side of the jaw 162 is beveled at 165 in order to cause the leading end 166 of the wire to be cammed downwardly under the jaw 162 when the latter is moved rearwardly into engagement with such end. The jaw 163 projects below the bottom of the jaw 162 and is provided with a spring pressed indexing roller 167 which serves to maintain the jaw in either its open position or its closed position. At the time that the jaw 162 is moved rearwardly into engagement with the end 166 of the wire the jaw 163 is being maintained in its open position by the spring 167, with the result that the end 166 of the wire upon passing under the jaw 162 will spring upwardly into the space present between the jaws 162 and 163.

The carriage 161 is provided near its left end with two downwardly extending lugs 168 and 169 (see Figs. 7 and 10) which are hingedly connected by a pin 170 to the upper ends of two arms 171 and 172 on a bracket 173. The lug 168 on the carriage is normally pressed against the arm 171 on the bracket by a coil spring 174 which surrounds the pin 170 and is compressed between the lug 169 on the carriage and the arm 172 on the bracket. The carriage 161 and the bracket 173 normally move together as a unit. The bracket 173 is slidingly mounted at its lower end on a guide rod 175 which extends from the left-hand end of the casing of the machine to a bracket 176 which projects upwardly from the bottom of the casing. The carriage 161 is provided with a laterally extending portion 177 which is slotted at 178 and slidingly embraces a guide rod 179. The rod 179 is secured at its ends to brackets 180 and 181 which project downwardly from the top of the casing. The slotted portion 177 of the carriage 161 permits the carriage to move forwardly and rearwardly but prevents the same from tilting upwardly or downwardly any appreciable amount during such movement. The bracket 173 supports the carriage 161 during both its front and back movements and its right and left movements.

The bracket 173 is provided, at a point beneath the guide rod 175, with a downwardly and rearwardly extending lug 182 which slidingly engages a rod 183. The rod 183 is mounted at its ends in two downwardly extending arms 184 and 185 which are rigidly attached to the opposite ends of a tube 186. The tube 186 is journaled at its ends on pins 187 and 188. The pin 187 is supported in a bracket 189 on the bottom of the casing near the left-hand end of the same, while the pin 188 is supported in a portion of the previously described bracket 176. Another arm 190 extends rearwardly from the tube 186 and is provided at its free end with a cam follower 191 which operates in a cam groove 192 in a cam 193 on the cam shaft 85. When the cam shaft 85 rotates, the groove 192 in the cam 193 will impart downward movement to the cam follower 191 and the resultant rocking of the tube 186 will shift the rod 183 rearwardly, causing the carriage 161 to move from its rearmost position to its foremost position. Because of the sliding connection between the lug 182 and the rod 183 this back to front movement of the carriage 161 (as well as a front to back movement) can take place in both the left-hand and right-hand positions of the carriage.

The carriage 161 is moved from its left-hand position to its right-hand position and back again by a lever 194 (see Figs. 6, 7 and 10) which is pivoted at 195 to a bracket 196 on the rear wall of the casing. The lever 194 is provided intermediate its ends with a cam follower 197 which operates in a groove 198 in a cam 199 on the cam shaft 85, and is provided at its free end with an anti-friction roller 200 which is positioned between and engages the lower portions of the arms 171 and 172 of the bracket 173.

After the carriage 161, with the supporting bracket 173, has returned to its left-hand position after having picked up the new end 166 of the wire, the right-hand face of the lug 168 on the carriage will be engaged by the front end 201 of a scale beam lever 202. The lever 202 (see Figs. 6, 9 and 9a) is pivoted at 203 to a small bracket portion 204 on a slide plate 205, and the slide plate 205 is movably mounted in a forwardly and rearwardly extending guideway 206 formed between two guide rails 207 on the left-hand end wall of the housing.

In engaging the lug 168 on the carriage 161 the scale beam lever 202 is shifted forwardly by a bell crank lever 208. One arm of the bell crank lever 208 extends upwardly and has a bifurcated end 210 which embraces a stud 211 on the slide plate 205, while the other arm 212 of the bell crank lever 208 extends rearwardly and is provided at its end with a cam follower 213 which operates in a cam groove 214 in a cam 215 on the cam shaft 85.

The front end 201 of the scale beam lever 202 is bifurcated in order to clear the hinge pin 170 when such end is projected forwardly into hooked engagement with the lug 168 on the carriage. The rear end 216 of the scale beam lever 202 is connected by a coil spring 217 with a bracket 218 on the slide plate 205. The scale beam 202 is provided, between its pivot 203 and its rear end 216, with a downwardly extending lug 219 which carries the previously mentioned electric switch 68. When the scale beam lever 202 is shifted forwardly into its hooked position with respect to the carriage 161, the switch 68 will be shifted bodily into a position in register with the end 220 (see Fig. 37) of an adjustable set screw 221 mounted in the left-hand end wall of the housing. The end 220 of the screw 221 can be adjusted toward or away from the switch 68 by a knurled finger wheel 222 which is formed on the screw exteriorly of the housing. Inadvertent movement of the screw 221 is prevented by a spring 223 which engages frictionally with the knurled portion of the finger wheel 222. A stop 224 on the bracket 218 limits the extent to which the spring 217 can move the rear end 216 of the scale beam lever 202 to the right.

A friction holder 230 is positioned adjacent the delivery end 41 of the track 39. This holder (see Figs. 6, 7, 14 and 32) consists of a bar 231 which is slidably mounted in a guide bracket 232 on the underside of the top of the housing of the machine. The bar 231 is provided at its front end with two forwardly opening jaws 233 and 234. The lower jaw 233 is fixed with respect to the bar 231, while the upper jaw 234 is pivoted at 235 to the bar and is urged toward the lower jaw by a spring 236. The front ends of the jaws are beveled to provide a rearwardly converging throat 237 between the same for the reception of the leading end 166 of the wire, and the sides of the jaws which face the delivery end 41 of the track 39 are also beveled to cause the jaws to be cammed apart upon being engaged by the wire. The bar 231, with the jaws 233 and 234, is moved forwardly and rearwardly in the bracket 232 by a lever 238. This lever is pivoted at its lower end to a bracket 239 on the bottom of the housing and is connected at its upper end to the rear end of the bar 231. At a point intermediate its ends the lever 238 is provided with a cam follower 240 which operates in a cam groove 241 in a cam 242 on the cam shaft 85.

The friction holder 230 is advanced to the position shown in Fig. 22 just before the leading end 166 of the wire emerges from the delivery end 41 of the track 39. As the gripper 160 on the reciprocating carrier 161 moves rearwardly in its extreme right-hand position to pick up the end 166 of the wire from the then overlapping holder 230, the latter is further advanced, as shown in Fig. 25, causing the end 166 of wire in the holder to be projected forcibly into the gripper. At this point a leaf spring 243, which is attached to the holder 230 engages a downwardly extending stud 244 (see Figs. 25 and 38) on the underside of the pivoted jaw 163 of the gripper 160 and moves the jaw 163 into its closed gripping position on the wire, against the yielding resistance of the indexing spring 167. As soon as this has occurred, the friction holder 230 is retracted to a position to the rear of the delivery end 41 of the groove 48 in the track 39 (see Fig. 26), and the reciprocating gripper 160 is moved forwardly, carrying with it the end 166 of the wire.

During the tensioning, twisting and cutting operations, the reciprocating gripper 160 is located at the left-hand side of the tensioning, twisting and cutting mechanisms, in firmly gripped engagement with the tensioned wire, and remains in that location until the beginning of the next operating cycle of the machine (see Figs. 29 and 30).

At the beginning of the next operating cycle, the reciprocating gripper 160, with the surplus end of the wire cut by the left-hand cutter 87 at 245 (see Fig. 31), is moved forwardly, bringing the stud 244 on the bottom of the pivoted jaw 163 into engagement with a stationary stop 246. As the gripper 160 completes its forward movement, the jaw 163 is forced open by the stop 246 against the yielding resistance offered by the indexing spring 167 and the cut end 247 (see Figs. 23 and 31) then drops free of the gripper into the open top of a suitably located waste chute 248 on the front of the machine.

During the movement of the gripper 160 to the left with the leading end 166 of the looped wire prior to the tensioning, twisting and cutting operations, the stud 244 on the bottom of the pivoted jaw 163 of the gripper 160 is caused to clear the stop 246 by a slight rearward jog in such movement, which jog is obtained by a momentary pause in the right to left motion of the reciprocating carriage 161 brought about by the provision of a straight section at 249 (see line K of Fig. 48) in the groove 198 of the cam 199, combined with the commencement of the front to rear motion of the carriage.

As previously stated, the reversible electric motor 62 which drives the feed rolls 46 rotates in one direction when switches 67, 68, 69 and 70 are closed and switches 71 and 72 are open, and rotates in the opposite direction when switches 67, 68, 71 and 72 are closed and switches 69 and 70 are open.

Switch 67—which is controlled through the target 73—opens when the leading end 166 of the looped wire engages and tilts the target (see Fig. 22), and closes when the leading end 166 is withdrawn forwardly away from the target by the reciprocating gripper 160 (see Fig. 26).

Switch 68—which is controlled through the scale beam 202—opens when the front end 201 of the scale beam, after having shifted forwardly into hooked engagement with the reciprocating carrier 161, is moved slightly to the right by the tension on the wire upon such tension overcoming the predetermined resistance offered by the spring 217. The switch 68 closes again as soon as the tension on the wire is released by the cutting off of the surplus end 247 held by the gripper 160 (which surplus end was initially the leading end 166 of the looped wire).

Switch 69 is mounted on the rear wall of the housing of the machine, behind the cam 91 which controls the operation of the cutters 87 (see Fig. 11), and is actuated by a boss 250 on the periphery of the cam 91. In the zero position of the cam shaft 85 (which is the position of such shaft at the commencement of each operating cycle of the machine) the switch 69 is held closed by the boss 250, but as soon as the cam shaft starts to rotate the boss moves clear of the switch and allows the latter to immediately spring open. The switch 69, upon opening, remains in its open position until the cam shaft 85 has made one complete revolution. Upon completion of that revolution, the boss 250 again closes the switch 69.

Switch 70 is mounted on the rear wall of the housing, behind the cam 193 which controls the forward and rearward movement of the reciprocating carriage 160 (see Fig. 10), and is actuated by a boss 251 on the periphery of the cam 193. This switch, like the switch 69, is held closed in the zero position of the cam shaft 85, but opens as soon as the cam shaft starts to rotate and closes only when the cam shaft has made one complete revolution.

Switch 71 is mounted on the rear wall of the housing, behind the cam 215 which controls the forward and rearward shifting of the scale beam 202 (see Fig. 9), and is actuated by a boss 252 on the periphery of the cam 215. This switch stands open in the zero position of the cam shaft 85 and remains open after the cam shaft has started to rotate. When the cam shaft has rotated through 220° the boss 252 on the periphery of the cam 215 engages with switch 71 and forces the latter into its closed position. Since the cam shaft 85 comes to rest for a period after having rotated through 220° switch 71 is held closed for the duration of that period. When the cam shaft 85 starts up again, to complete its last 140° of rotation, switch 71 opens, and remains open after the cam shaft has reached its 360° position (which latter position is the zero position of the cam shaft for the next operating cycle).

Switch 72 is mounted on the rear wall of the housing, behind the cam 101 which controls the operation of the holding and ejecting fingers 92 (see Fig. 13). This switch stands open in the zero position of the cam shaft 85 and remains open after the cam shaft has started to rotate.

When the cam shaft has rotated through 220° a boss 253 on the periphery of the cam 101 engages with the switch 72 and forces the latter into its closed position. Since the cam shaft 85 comes to rest for a period after having rotated through 220°, the switch 72 is held closed for the duration of that period. When the cam shaft 85 starts up again, to complete its last 140° of rotation, the switch 72 opens and remains open after the cam shaft has reached its 360° position (which position is the zero position of the cam shaft for the next operating cycle).

In producing the tie the twisting pinion 79 (see Fig. 12) makes three complete revolutions and a small part of another revolution, starting with the slot in the pinion in a forwardly opening position and ending with a slot in a downwardly opening position. The added part of another revolution imparts an over-twist to the tie, which over-twist is subsequently absorbed by the natural tendency of the twisted wire portions to spring back slightly when the turning force on the pinion 79 is released. The pinion 79 is indexed in its over-twist position by a spring-pressed ball 254 (see Figs. 12 and 36) in a bracket 255, which ball engages in a recess 256 in one face of the gear 82 as soon as the last tooth on the sector gear 84 leaves the pinion 83. Immediately after the twisting pinion 79 has come to rest in its indexed over-twist position it will be positively moved back into its initial position (in which the slot in the pinion opens forwardly again) by a bell crank lever 257 which is pivoted at 258 to a depending bracket 259. One arm 260 of the bell crank lever 257 is provided with a tooth 261 which is so arranged as to move into mesh with the teeth on the pinion 83, and the other arm 262 of the bell crank lever is provided with a cam follower 263 which is adapted to be momentarily engaged by a projection 264 on the periphery of a cam 265 on the cam shaft 85. This momentary engagement, which occurs immediately after the twisting pinion 79 has come to rest in its over-twist position, rocks the bell crank lever 257, causing the tooth 261 on the arm 260 to kick the pinion 83 backwardly far enough to return the slot in the twisting pinion 79 to its forwardly opening position. Another spring-pressed ball 266 in the bracket 255 then rides into a recess 267 in the other face of the gear 82 (which recess is located directly opposite the recess 256) and securely indexes the twisting pinion 79 in its initial position again.

The flexible tube 47, which guides the incoming wire from the feed rolls 46 into the groove 48 in the track 39, is secured at its delivery end to the right-hand holding and ejecting finger plate 92 by a readily removable attaching bracket 268 (see Figs. 2 and 13), while the receiving end of the flexible tube is free to float slightly toward or away from the feeding rolls 46 and is slidably mounted in a tubular bracket 269 at the point of discharge of the rolls. This endwise movement of the flexible tube 47 compensates for the change in distance between the feed rolls and the right-hand plate 92 resulting from the forward and rearward movement of that plate.

As the holding finger 93 on the left-hand holding and ejecting finger plate 92 is required to pick up the wire in the groove 48 in the bottom of the track 39 at the time that the wire in that portion of the track is being moved into the twisting pinion, a slot 270 (see Fig. 21) is provided in the track 39 at that point to permit passage of the holding finger.

The stationary holding yokes 80, which serve to prevent the overlapped wire portions from turning at the location of the yokes during the rotation of the interposed twisting pinion, and the filler blocks 86, which determine the lengths of the twisted sections between the holding yokes and the twisting pinion, are provided with forwardly opening slots with which the slot in the twisting pinion registers when the latter is in its initial position. These holding yokes and filler blocks are apertured at their rear ends to fit over the pivot pins 271 and are apertured intermediate their ends to fit over dowel pins 272 (see Figs. 11, 12A, 32 and 32A). The pins 271 and 272 are fixed in and project from the two-part casing 273, between which casing parts the twisting pinion 79 is positioned and in which the ends 274 of the twisting pinion are journaled. The pins 271 cooperate with the pins 272 to anchor the holding yokes and filler blocks against movement during operation and also cooperate with the casing 273 and the plates 92 to position the filler blocks 86, holding yokes 80, cutters 87 and cutter holders 88 in operative assembly in the casing 273, while permitting ready removal or re-assembly in said casing.

As the looped wire is being stripped from the groove 48 in the track 39 by the pull on the wire exerted by the reverse rotation of the feed rolls 46 at the beginning of the tensioning operation, the upper portion of the loop is guided straight down onto the top of the article to be tied by an arm 275 (see Figs. 2 and 43) which is pivoted at 276 to the upper portion of the track. The arm 275 consists of a sheet metal strip which is bent back on itself to provide two gradually converging spring fingers 277. These fingers 277 bear resiliently against each other at their extremities. The arm 275 is normally maintained in the upswung position shown in full lines in Fig. 2 by a spring 278, but when the looped wire is stripped from the groove 48 in the upper portion of the track the wire will move downwardly between the fingers 277 and will swing the arm 275 downwardly until the latter reaches the top of the article. Thereafter the continuing tension on the wire will pull the same from between the fingers 277 allowing the arm 275 to swing upwardly again into its initial position.

The operation of the machine will now be described:

After each tying operation the machine will automatically come to rest with a new loop of wire in the track 39; with the leading end 166 of the wire engaged by the friction holder 230; with the target 73 held in a tilted position by the leading end 166 of the wire; and with the traveling gripper 160 standing at the left-hand side of the twisting mechanism, holding the surplus end 247 of the wire cut from the previously formed tie.

Before starting the next tying operation the operator places the article to be tied on the top plate 12 of the machine within the looped track 39. With the article in position the operator momentarily depresses the foot pedal 122.

This movement of the foot pedal 122 throws in the clutch 114 and starts the control shaft 121 rotating. The cam 137 on the control shaft immediately throws in the clutch 37, and the pressure bar 15 descends into engagement with the upper surface of the article to be tied, compressing the article (if of a compressible character) with a predetermined amount of pressure and holding it firmly against movement. This pressure on the article continues until after the tensioning operation has been completed. As soon as the resistance which the article offers to compression exceeds the pressure for which the adjustable slip clutch unit 27 has been set the unit 27 will start slipping and will continue to slip until the compression clutch 37 has been automatically disengaged by the action of the cam 137 (at the point 285 in lines A and U of Fig. 48). After the clutch 37 has been disengaged the compression of the bar is no longer important since the wire is then tightly around the package and is so held by the spring-engaged disk brake on the motor 62. The clutch 38, which elevates the pressure bar 15, is thrown into operation by the cam 137 (at the point 286 in lines E and U of Fig. 48).

As the cam 137 throws in the clutch 37 the cam 138 on the control shaft throws in the clutch 147 and starts the cam shaft 85 rotating. The cam 193 on the cam shaft thereupon moves the gripper 160 forwardly. Near the front end of this forward movement the stud 244 on the bottom of the pivoted jaw 163 of the gripper 160 strikes the stop 246, causing the jaw 163 to open and drop the surplus wire end 247 into the top of the waste chute 248. As soon as this has occurred the cam 199 on the cam shaft moves the gripper 160 from its foremost left-hand position to its foremost right-hand position, and the cam 193 on the cam shaft then moves the gripper 160 rearwardly. As the gripper 160 nears the end of its rearward movement the cam 242 moves a friction holder 230 (with the wire end 166 which it is embracing) forwardly a little, causing the wire end 166 to be cammed under the nose 165 of the gripper 160 into the space between the then open jaws 162 and 163 of the gripper. At the same time the spring 243 on the friction holder 230 engages with the stud 244 on the bottom of the pivoted jaw 163 and swings such jaw into its closed position in firmly gripped engagement with the wire end 166. After this has occurred the cam 242 moves the friction holder 230 rearwardly into an out-of-the-way position behind the open end of the groove 48 in the track 39, and the cam 193 moves the gripper 160 forwardly. During its rearward movement the friction holder 230 relinquishes its grasp on the wire. As the closed gripper 160 starts its forward movement with the leading end 166 of the wire, a portion of the wire within the groove 48 is withdrawn forwardly from the resiliently yieldable grasp of the retaining strip 49 at the discharge end 41 of the track 39.

As soon as the gripper 160 has reached its forward position the cam 199 moves it toward the left. During the movement of the gripper 160 toward the left the wire continues to be stripped from the groove 48 in the track 39. As the gripper 160 approaches the end of its movement to the left the cam 199 momentarily interrupts such movement. At the same instant the cam 193 starts moving the gripper 160 rearwardly, causing the stud 244 on the pivoted jaw 163 to clear the side of the stop 246. The cam 199 then moves the gripper 160 to the left to its initial position again at the left-hand side of the twisting mechanism—this time with the leading end 166 of the wire firmly gripped between the jaws 162 and 163.

The cam 101 on the cam shaft now swings the holding and ejecting finger plates 92 (together with the discharge end of the flexible tube 47) rearwardly, stripping the wire from the lower portion of the track 39 and forcing the two overlapped strands of the looped wire rearwardly into the forwardly opening slots in the twisting pinion 79 and holding yokes 80. At the same time the cam 215 on the cam shaft shifts the scale beam 202 forwardly into a position wherein the front end 201 of the scale beam is in laterally hooked engagement with the lug 168 of the carriage 161.

At this point in the operation of the machine the cam 138 on the control shaft throws out the clutch 147 and the roller 149 rides into the notch 151 in the disk 152 on the cam shaft 85 and stops the cam shaft at the end of 220° of rotation. As the cam shaft comes to rest after having rotated through 220° from its initial position the boss 253 on the cam 101 closes the electric switch 72, and the boss 252 on the cam 215 closes the switch 71. Since the electric switch 67 moved into this closed position when the leading end 166 of the wire was withdrawn by the gripper 160 from disengagement with the target 73, and since the electric switch 68 was already in its closed position due to the absence of any predetermined pull by the wire on the front end 201 of the scale beam 202, the circuit of the reversible electric motor 62 controlled jointly by the switches 67, 68, 71 and 72 is completed by the closing of the switches 71 and 72 upon the cam shaft reaching its 220° position. It will be understood that in the 220° position of the cam shaft the switches 69 and 70 are both standing open, having been opened at the time that the cam shaft started its movement. Upon completion of the circuit of the electric motor 62, through the switches 67, 68, 71 and 72 by the closing at this point of the switches 71 and 72, the feed rollers 46 start rotating backwardly, stripping the looped wire from the track 39 and constricting it about the article to be tied. As the wire is fed back from the rolls 46 the spring 51 in the pocket 44 in the right-hand side of the table deflects the wire rearwardly into a horizontal loop of progressively increasing size which rests loosely in the pocket. The clutch block 43 prevents the loose wire in the pocket 44 from being pushed back through the tube 42 toward the supply.

Since the leading end 166 of the looped wire is held against movement by the gripper 160 at the left-hand side of the twisting mechanism, the pull on the wire exerted by the feed rolls 46 draws the looped wire tightly about the article and places tension on it. When this tension reaches a predetermined amount (determined by the capacity of the spring 217 to resist elongation) the spring 217 elongates, allowing the scale beam 202 to oscillate under the pull of the wire far enough to force the switch 68 open. As soon as the switch 68 opens the motor 62 stops, the feed rolls 46 come to rest, and the spring-engaged disk clutch associated with the motor 62 holds the rolls 46 against movement, thereby maintaining the desired tension on the wire.

It will be understood that while this tensioning operation has been taking place the control shaft 121 has continued to rotate but the cam shaft 85 has remained stationary in its 220° position.

The cam 138 on the control shaft now throws in the clutch 147 again, starting the cam shaft 85 rotating through its last 140° of rotation. The sector gear 84 on the cam shaft thereupon causes the twisting pinion 79 to make three complete revolutions, followed by a part of another revolution to set up an overtwist in the tie. Upon completion of the overtwist the gear 82 through the action of the spring-pressed ball 254 holds the gear 83 in position to be acted upon by the cam 264 on the disk 265 through the toothed bell crank lever 257 to turn back the twisting pinion 79 to a point where the slot in the twisting pinion is in its initial forwardly opening position.

At the end of this tie forming operation the cam 91 causes the cutters 87 to sever the single strands of the wire at opposite ends of the tie, the left-hand cutter severing only the rearmost strand and the right-hand cutter severing only the foremost strand. At the same time the cam 242 moves the friction holder 230 forwardly from its retracted position to its intermediate or normal position. As soon as the cutters have operated, the cam 101 swings the holding and ejecting finger plates 92 forwardly, causing the ejector fingers 94 to force the completed tie out of the slots in the twisting pinion and holding yokes.

The tied article resting on the top plate 12 of the machine can now be removed from the top plate, since the tie in the looped wire has been completed and the wire used in forming the loop and the tie has been cut free from the supply and also from the surplus end at both extremities of the tie.

The severing of the rearmost strand of wire by the left-hand cutter 87 releases the pull on the front end 201 of the scale beam 202, allowing the scale beam to oscillate back to its normal position and allowing the switch 68 carried by the scale beam to close again. As the boss 252 on the cam 215 is out of engagement with the switch 71 when the cam shaft 85 has completed the last 140° of its rotation, the closing of the switch 68 at this time does not again energize the motor 62 in reverse. Instead, when the cam shaft 85 completes the last 140° of its rotation the boss 250 on the cam 91 closes the switch 69 and the boss 251 on the cam 193 closes the switch 70, thereby completing the circuit of the motor 62 through the switches 67, 68, 69 and 70, starting the motor 62 in a forward direction and rotating the wire feeding rolls 46 in a forward direction.

The rolls 46 force the incoming wire (first from the loose loop in the pocket 44 and thereafter from the supply) through the tube 47 into the groove 48 in the receiving end of the track 39. This incoming wire travels in the groove 48 about the entire circumference of the track, emerges from the delivery end 41 of the track, passes between the jaws 233 and 234 of the friction holder 230, and strikes and tilts the target 73, thereby opening the switch 67 and interrupting the circuit of the motor 62. As soon as this interruption occurs the feeding of the wire will stop, with the track 39 of the machine fully loaded with wire, in readiness for the next tying operation.

At about the time that the cam shaft 85 starts in on its second period of rotation, to effect the twisting and cutting of the overlapped wire strands, the cam 137 on the control shaft 121 throws in the clutch 38 and the pressure bar 15 rises, returning to its uppermost position in readiness for the next operation of the machine. When the pressure bar 15 reaches its uppermost position the cam 137 returns the clutch 38 to its neutral position.

In producing the tie shown in Fig. 49 the stationary holding yokes 80 engage the overlapped wire strands at the spaced points 287 and prevent the strands from turning about each other at such points, while the twisting pinion 79 engages the strands midway between the holding yokes at the point 288 and forces the strands to turn about each other into two oppositely directed twists 289.

Fig. 48 is a diagrammatic representation of the action of the principal moving parts of the machine. This view illustrates the operating sequence of such parts with relation to one full operating cycle of the machine. The horizontal distance across the chart represents the total time consumed in one full operating cycle. The time consumed is preferably in the neighborhood of three seconds, but it may be considerably more or considerably less. This time is divided across the top of the chart into a preliminary period $a$ during which engagement of the clutches takes place at the beginning of the cycle, a period $b$ during which the pressure bar 15 descends and the first part of the rotation of the cam shaft 85 takes place (through 220°), a period $c$ during which the tensioning of the looped wire takes place, a period $d$ during which the last part of the rotation of the cam shaft 85 takes place (through 140°), a period $e$ during which the pressure bar 15 rises and a new length of wire is fed into and about the track 39, and a period $f$ during which disengagement of the clutches takes place at the end of the cycle.

In this chart the shaded section of line A indicates that portion of the cycle during which the pressure bar 15 is descending; the shaded section of line B indicates that portion of the cycle during which the cam shaft 85 is turning through its first 220° of rotation; the shaded section of line C represents that portion of the cycle during which the looped wire is being tensioned about the article; the shaded section of line D represents that portion of the cycle during which the cam shaft 85 is turning through its last 140° of rotation; the shaded section of line E represents that portion of the cycle during which the pressure bar 15 is being elevated, and the shaded section of line F represents that portion of the cycle during which a new length of wire is being fed into and about the track 39 in readiness for the next tying operation.

The horizontal distance across the chart, in addition to representing the time consumed in one full operating cycle of the machine, represents one complete revolution of the control shaft 121, through 360°, as indicated by line G. The opening and closing movements of the pivoted jaw 163 of the traveling gripper 160 are indicated in line H, in the first period of movement of the cam shaft 85. The back-to-front and front-to-back movements of the carriage 161, with the traveling gripper 160, are indicated in line J in the first period of movement of the cam shaft. The left-to-right and right-to-left movements of the carriage 161, with the gripper 160, are indicated in line K, in the first period of movement of the cam shaft. The back-to-front movement of the scale beam 202 is indicated in line L just prior to the end of the first period of movement of the cam shaft, and the front-to-back movement of the scale beam is indicated in the same line near the end of the second period of movement of the cam shaft. The advance and retraction of the friction holder 230 is indicated in line M, the friction holder being advanced from its normal position to its foremost position and then immediately retracted to its rearmost position in the first period of rotation of the cam shaft, and being returned to its normal position again just prior to the end of the second period of rotation of the cam shaft. The front-to-back movement of the ejecting fingers 94 is indicated in line N in the first period of rotation of the cam shaft, and the back-to-front movement of the same fingers is indicated in the same line at the end of the second period of rotation of the cam shaft. The operation of the cutters 87 is indicated in line P in the second period of rotation of the cam shaft. Likewise, the operation of the twisting pinion 79 is indicated in line Q in the second period of rotation of the cam shaft. The front-to-back movement of the holding fingers 93 is indicated in line R in the first period of rotation of the cam shaft, and the back-to-front movement of the same fingers is indicated in the same line in the second period of rotation of the cam shaft.

Line S represents the operation of the main clutch 114; line T, the operation of the cam shaft clutch 147; and line U, the operation of the compression and release clutches 37 and 38. Line V indicates with arrows the two time periods during which the motor 62 is operating—the period $g$ representing the time during which the motor 62 turns in one direction to withdraw the wire from the track 39 and tension it about the article, and the period $h$ representing the time during which the motor 62 feeds the wire forwardly into and about the track. Lines $W^1$ to $W^6$ inclusive represent respectively the operation of switches 67 to 72 inclusive. As will be observed in these last mentioned lines, the switches 67, 68, 71 and 72 are closed and the switches 69 and 70 are open during the motor operating period $g$, while the switches 67, 68, 69 and 70 are closed and the switches 71 and 72 are open during the motor operating period $h$.

It will be observed that in the design of this machine care has been taken to enclose practically all of the moving parts, whereby to seal them so far as practical against the entrance of dust and other foreign matter. The lower portion of the housing of the machine preferably forms a sump which contains a bath of oil for lubricating the various moving parts within the housing. As previously mentioned, the machine can be removed and replaced as a unit with respect to the support 10—the motors and associated driving means for the machine being the only moving parts carried directly by the support. In the design of the various operating mechanisms, such as the twisting pinion, the cutting mechanism, the scale beam tensioning device, the cam shaft assembly, etc., the parts have been so constructed as to permit of their ready removal or replacement as complete subassembly units, thereby greatly facilitating repairs, servicing and adjustment.

We claim:

1. In a machine of the character described, a track which is looped in the form of a flat helix with the delivery end of the track offset with respect to the receiving end of the same, means for feeding wire into the track, means for removing the wire laterally from one of the ends of the track and bringing the offset ends of the wire together, and means for thereafter connecting said ends.

2. In a machine of the character described, a pair of pivotally mounted plates provided with wire holding and ejecting fingers, and cam means for oscillating said plates, one portion of said cam means serving to move the holding fingers in one direction, and another portion of said cam means serving to move the ejecting fingers in the opposite direction.

3. In a machine of the character described, a wire joining mechanism, a pair of pivotally mounted cutter holding plates at opposite sides of said mechanism, a reciprocating slide, connections between the plates and the slide for oscillating the plates when the slide is reciprocated, and a cam for reciprocating the slide.

4. In a machine of the character described, a wire joining mechanism, a pair of pivotally mounted cutter holding plates at opposite sides of said mechanism, a reciprocating slide, connections between the plates and the slide for oscillating the plates when the slide is reciprocated, and a cam for reciprocating the slide, said cutter holding plates being adjustable toward and away from each other, and said connections between the plates and slide being shiftable laterally to compensate for variations in the spacing of the plates.

5. In a machine of the character described, means for tensioning a wire about an article to be tied, a scale beam, a spring in engagement with one end of the scale beam, a traveling wire gripper, and means for moving the gripper into engagement with the other end of the scale beam, whereby the tension put on the gripper by the action of said tensioning means on the wire will be opposed by the spring.

6. In a machine of the character described, means for tensioning a wire about an article to be tied, a scale beam, a spring in engagement with one end of the scale beam, a wire gripper adapted to engage the other end of the scale beam, whereby the tension put on the gripper by the action of said tensioning means on the wire will be opposed by the spring, and an electric switch in the path of oscillation of the scale beam for controlling said tensioning means to stop the pull of the wire against the scale beam upon oscillation of the latter.

7. In a machine of the character described, a wire joining mechanism, a traveling gripper for holding one end of the wire during the joining operation, means for imparting a rectilinear movement to said gripper in a path about the joining mechanism, and means for maintaining the gripper in a substantially horizontal position throughout its rectilinear movement.

8. In a machine of the character described, a wire joining mechanism, a traveling wire gripper having a pivoted jaw, means for moving the gripper bodily from one side of the joining mechanism to the other, a scrap chute at one point in the path of travel of the gripper, and a stationary stop engageable with a portion of the pivoted jaw of the gripper at the location of the chute for causing the pivoted jaw to open and drop a cut end of the wire into the chute.

9. In a machine of the character described, a wire joining mechanism, a gripper for holding one end of the wire during the joining operation, and means for moving the gripper from a position at one side of the joining mechanism to a position at the other side of said mechanism.

10. In a machine of the character described, wire joining and cutting mechanisms, a gripper for holding one end of the wire during the joining and cutting operations, means for moving the gripper from a position at one side of said mechanisms to a position at the other side of the same, means for causing the gripper to pick up the wire when at one side prior to the joining and cutting operations, and means for causing the gripper to relinquish the wire when at the other side following the joining and cutting operations.

11. In a machine of the character described, a looped track, means for feeding wire into the track, a wire joining mechanism located to one side of a portion of the track, and a flexible tube associated with the wire feeding means for directing the wire into the track, said tube being movable to permit transfer of the wire from a portion of the track laterally to the wire joining mechanism.

12. In a machine of the character described, a looped track, means for feeding wire into the track, a wire joining mechanism at the bottom of the loop formed by the track, a friction holder engageable with one end of the wire in the track, a gripper for picking up said end, means for moving the gripper toward said end to pick up the same, and means for simultaneously advancing the friction holder toward the gripper to effect engagement of the wire by the latter.

13. In a machine of the character described, a looped track, means for feeding wire into the track, a wire joining mechanism at the bottom of the loop formed by the track, a friction holder engageable with one end of the wire in the track, a gripper for picking up said end, means for moving the gripper toward said end to pick up the same, and means for simultaneously advancing the friction holder toward the gripper to effect engagement of the wire by the latter, said gripper being provided with fixed and movable jaws and being provided on its fixed jaw with a beveled portion for camming the wire downwardly, whereby to permit the wire to thereafter spring upwardly into a position between the jaws.

14. In a machine of the character described, a looped track, means for feeding wire into the track, a target at the discharge end of the track, adapted to be engaged by the end of the wire, means controlled by the target for stopping the feeding means upon engagement of the wire with the target, a wire joining mechanism, and means for transferring the wire from the lower portion of the track into the wire joining mechanism, said target being movable into an out-of-the-way position by the transfer means upon movement of the latter.

15. In a machine of the character described, means for tensioning a wire about an article, a rotary twisting pinion, stationary holding yokes at opposite sides of the twisting pinion, movable cutters beyond the holding yokes, and filler blocks between the twisting pinion and the holding yokes, said filler blocks being removable or replaceable by other filler blocks of different thicknesses, and said holding yokes being shiftable to compensate for such difference, whereby to vary the spacing between the holding yokes, the spaces between the ends of the twisting pinion and the mounting means for the filler blocks and holding yokes being completely filled by the filler blocks and holding yokes irrespective of the order of arrangement of said parts in such spaces.

16. In a machine of the character described, a wire joining mechanism, a traveling gripper for holding one end of the wire during the joining operation, means for imparting a circuitous movement to said gripper in a path about the joining mechanism, and means for maintaining the gripper in substantially horizontal position throughout its circuitous movement.

17. In a machine of the character described, a wire conduit which is provided with a wire receiving end and a wire delivery end and is arranged in the form of a loop with the delivery end offset laterally with respect to the receiving end, means for feeding a wire endwise through the conduit, said conduit being so constructed as to permit the wire to be stripped from the conduit throughout the looped portion of the latter, means for removing one of the ends of the wire from one of the ends of the conduit and moving it laterally into a position adjacent the other end of the wire, means for applying endwise tension to the wire to strip it from the looped portion of the conduit, and means for joining the two ends of the wire together.

18. In a machine of the character described, a wire conduit which is provided with a wire receiving end and a wire delivery end and is arranged in the form of a loop with the delivery end offset laterally with respect to the receiving end, a tube which is shiftable from a position in alignment with the receiving end of the conduit into a position alongside the delivery end of the conduit, means for feeding a wire endwise through the tube into the receiving end of the conduit and about the looped portion of the conduit to the delivery end of the latter, said conduit being so constructed as to permit the wire to be stripped from the conduit throughout the looped portion, means for removing the wire from the receiving end of the conduit and shifting it into a position adjacent the end of the wire projecting from the delivery end of the conduit, said tube shifting with the wire during such transfer, means for applying endwise tension to the wire to strip it from the looped portion of the conduit, and means for joining the two ends of the wire together.

19. In a machine of the character described, a wire conduit which is provided with a wire receiving end and a wire delivery end and is arranged in the form of a loop with the delivery end offset laterally with respect to the receiving end, means for feeding a wire endwise through the conduit, said conduit being formed in part from a plurality of resiliently yieldable fingers which permit the wire to be stripped from the conduit throughout the looped portion of the latter, means for removing one of the ends of the wire from one of the ends of the conduit and moving it laterally into a position adjacent the other end of the wire, means for applying endwise tension to the wire to strip it from the looped portion of the conduit, and means for joining the two ends of the wire together.

20. In a machine of the character described, a looped conduit, means for guiding into the machine wire from a continuous supply, means for feeding the wire endwise through the conduit to form a loop in the wire, means controlled by the position of the leading end of the wire for stopping the operation of the feeding means after the loop has been formed, means for holding the leading end of the wire against retrograde movement, means for reversing the feeding means to constrict the looped portion about an object, means for joining the ends of the looped portion together, and means for forming into a loose loop of progressively increasing size the unused wire accumulating by reason of the reversal of the feeding means.

21. In a machine of the character described, a looped conduit, means for guiding into the machine wire from a continuous supply, means for feeding the wire endwise through the conduit to form a loop in the wire, means controlled by the position of the leading end of the wire for stopping the operation of the feeding means after the loop has been formed, means for holding the leading end of the wire against retrograde movement, means for reversing the feeding means to constrict the looped portion about an object, means for joining the ends of the looped portion together, means for forming into a loose loop of progressively increasing size the unused wire accumulating by reason of the reversal of the feeding means, and means for preventing the unused wire in the loose loop from moving backwardly toward the supply.

22. In a machine of the character described, a looped conduit arranged in a vertical plane, means for guiding into the machine wire from a continuous supply, means for feeding the wire endwise through the conduit to form a loop in the wire, means controlled by the position of the leading end of the wire for stopping the operation of the feeding means after the loop has been formed, means for holding the leading end of the wire against retrograde movement, means for reversing the feeding means to constrict the looped portion about an object, means for joining the ends of the looped portion together, a flat chamber of substantial area arranged in a horizontal plane between said feeding means and said guiding means, into which chamber the unused wire is fed backwardly by said feeding means upon the reversal of the latter, and means in the chamber for deflecting the fed back wire into the form of a loose loop of substantial area supported by the chamber.

23. In a machine of the character described, a wire joining mechanism, a pair of pivotally mounted cutter holding plates at opposites sides of said mechanism, a reciprocating slide, connections between the plates and the slide for oscillating the plates when the slide is reciprocated, and means for reciprocating the slide.

24. In a machine of the character described, means for tensioning a wire about an article to be tied, a scale beam, a spring in engagement with one end of the scale beam, a wire gripper adapted to engage the other end of the scale beam, whereby the tension put on the gripper by the action of said tensioning means on the wire will be opposed by the spring, and means actuated by the oscillation of the scale beam for controlling said tensioning means to stop the pull of the wire against the scale beam upon oscillation of the latter.

25. In a machine of the character described, means for feeding wire into the machine, a target in the path of movement of the wire, adapted to be engaged by the end of the wire, and means controlled by the movement of the target in the direction of movement of the wire for stopping the feeding means upon engagement of the wire with the target, said target being also movable in a direction at right angles to the movement of the wire.

26. In a machine of the character described, a wire joining mechanism, a traveling gripper for holding one end of the wire in operative relation to the joining mechanism, and means for imparting a circuitous movement to said gripper in a path about the joining mechanism.

27. In a machine of the character described, a wire joining mechanism, means for tensioning a wire about an article to be tied, a scale beam, a spring in engagement with one end of the scale beam, a traveling wire gripper, means for moving the gripper into engagement with the other end of the scale beam, whereby the amount of tension put on the gripper by the action of said tensioning means on the wire will be regulated by the spring, and means actuated by the movement of the scale beam under a predetermined amount of tension on the gripper for initiating the operation of the wire joining mechanism.

WILLARD F. VINING.
MARTIN L. ROWE.

REFERENCES CITED

The following references are of record in the file of this patent:

UNITED STATES PATENTS

| Number | Name | Date |
|---|---|---|
| 1,973,401 | Wright | Sept. 11, 1934 |
| 524,729 | Peters et al. | Aug. 21, 1894 |
| 2,134,187 | Harvey | Oct. 25, 1938 |
| 2,191,082 | Parker | Feb. 20, 1940 |
| 1,669,047 | Gerrard et al. | May 8, 1928 |
| 761,459 | Eastwood | May 31, 1904 |
| 1,360,237 | McChesney | Nov. 23, 1920 |
| 186,538 | Burr | Jan. 23, 1877 |
| 1,490,612 | Laencher | Apr. 15, 1924 |
| 1,417,329 | Jones | May 23, 1922 |
| 1,868,182 | Sullivan | July 19, 1932 |
| 1,845,830 | Hoge et al. | Feb. 16, 1932 |
| 1,426,039 | Candee | Aug. 15, 1922 |
| 1,653,648 | Malocsay | Dec. 27, 1927 |
| 2,356,904 | Workman | Aug. 29, 1944 |
| 653,597 | Thoens | July 10, 1900 |
| Re. 18,219 | McChesney | Oct. 6, 1931 |
| 1,357,883 | McChesney | Nov. 2, 1920 |
| 1,650,843 | McChesney | Nov. 29, 1927 |
| 2,194,108 | Wright | Mar. 19, 1940 |
| 2,088,133 | Evans | July 27, 1937 |
| 1,526,772 | Chapman | Feb. 17, 1925 |
| 1,581,794 | DeHaven | Apr. 20, 1926 |
| 1,029,078 | Miller | June 11, 1912 |
| 1,727,634 | Clouse et al. | Sept. 10, 1929 |
| 999,372 | Kempster | Aug. 1, 1911 |
| 420,509 | Griswould | Feb. 4, 1890 |
| 1,964,081 | Rausch | June 26, 1934 |

FOREIGN PATENTS

| Number | Name | Date |
|---|---|---|
| 588,480 | Germany | Nov. 18, 1933 |
| 755,356 | French | Sept. 4, 1933 |